US012641048B1

(12) United States Patent
Schreiber et al.

(10) Patent No.: US 12,641,048 B1
(45) Date of Patent: May 26, 2026

(54) SYSTEMS AND METHODS FOR PREVIEWING USER PATHS THROUGH MESSAGING JOURNEYS

(71) Applicant: BRAZE, INC., New York, NY (US)

(72) Inventors: Erika Schreiber, New York, NY (US); Ahsan Ziauddin, New York, NY (US); Steven Camina, New York, NY (US); Huan Do, New York, NY (US); Jordan Megibow, New York, NY (US)

(73) Assignee: Braze, Inc., New York, NY (US)

( * ) Notice: Subject to any disclaimer, the term of this patent is extended or adjusted under 35 U.S.C. 154(b) by 0 days.

(21) Appl. No.: 19/347,826

(22) Filed: Oct. 2, 2025

(51) Int. Cl.
*H04L 51/234* (2022.01)

(52) U.S. Cl.
CPC .................................. *H04L 51/234* (2022.05)

(58) Field of Classification Search
CPC ........ H04L 51/234; H04L 43/50; H04L 43/55
USPC ......................................................... 709/206
See application file for complete search history.

(56) References Cited

U.S. PATENT DOCUMENTS

| 11,032,226 | B1* | 6/2021 | Weinstock | .............. H04L 67/53 |
| 2018/0315000 | A1* | 11/2018 | Kulkarni | ............. G06F 16/1734 |
| 2019/0221133 | A1* | 7/2019 | Terry | ..................... G06N 5/048 |
| 2021/0044555 | A1* | 2/2021 | Orr | ....................... H04L 51/043 |
| 2021/0304106 | A1* | 9/2021 | Kulkarni | ............. G06F 16/1734 |
| 2024/0086970 | A1* | 3/2024 | Thompson | ......... G06Q 30/0269 |
| 2025/0191028 | A1* | 6/2025 | Thompson | ......... G06Q 30/0264 |

* cited by examiner

*Primary Examiner* — Ruolei Zong
(74) *Attorney, Agent, or Firm* — FisherBroyles, LLP

(57) ABSTRACT

Systems and methods for testing a messaging journey make use of a user interface that allows a tester to rapidly progress through multiple steps of a messaging journey that would normally occur over a period of days or weeks. The tester can determine in a matter of minutes whether the logic of the steps of the journey operate properly to send the user down the proper paths through journey. The tester can also determine whether the journey sends the proper messages to the user as the user progresses through the journey. The user interface allows the tester to selectively change various conditions and user data to ensure that all steps of the journey are operating properly.

28 Claims, 16 Drawing Sheets

903

904

902

JOURNEY
Welcome Journey

910

START TIME
1:00

912

START DATE
10-1-2025

914

USER
John Smith

916

MESSAGE
DESTINATION
tman@gmail.com

918

904

401
402
404
403
406
16
407
409
N
22
416
436
23
418
24
419
Y
N
421

903
902

STEP 16
- User Entered the Step on 10-2-25 at 1:01
- Determined had not Made a Purchase on the Website
- User Progressed on 10-2-25 at 1:01

STEP 22
- User Entered the Step on 10-2-25 at 1:01
- Sent Discount Message at 1:01 on 10-2-25
- User Progressed on 10-2-25 at 1:01

STEP 23
- User Entered the Step at 1:01 on 10-2-25
- User Progressed at 1:01 on 10-3-25

SYSTEMS AND METHODS FOR PREVIEWING USER PATHS THROUGH MESSAGING JOURNEYS

BACKGROUND OF THE INVENTION

The invention is related to messaging journeys that generate and send a series of messages to a user over a period of time according to predetermined rules. More specifically, the invention is related to ways of testing a messaging journey by previewing one or more paths that a user can take through the messaging journey and by reviewing the messages that are generated and sent to the user as the user traverses the path through the messaging journey.

A company can use messaging journeys to send messages to its users to enhance the user's engagement with the company. Such messages can be informational and/or the messaging can be designed to increase sales or usage of the company's products and services. Also, a company could employ the services of a customer engagement service to manage the flow of messaging from the company to its users. In which case, the messaging journey may be managed and executed by the customer engagement service. However, the aim is the same, to enhance user engagement with the company.

A company configures a messaging journey to deliver a series of messages to a user over an extended period of time. A single messaging journey could last for a period of days, weeks or even longer.

A single messaging journey could have multiple potential paths, and the actual path that a user takes through the messaging journey can be determined by the user's characteristics and any actions the user takes or does not take while the messaging journey is ongoing.

When a company or a customer engagement service configures a messaging journey, it is helpful to test whether the messaging journey operates as intended. This can include ensuring that the user is sent along the desired paths when the user takes certain actions. This also can include determining whether appropriate messages are generated and sent to the user as the user traverses the messaging journey.

Because messaging journeys are designed to occur over an extended period of time, it can be difficult to rapidly test a messaging journey. For example, if the messaging journey is configured to occur over a period of two weeks, one could set up a test user having certain characteristics, and then have the test user begin the messaging journey. One could then observe how the test user traverses the messaging journey over the two-week period, and what messages the test user receives while traversing the messaging journey.

Unfortunately, testing a messaging journey in this fashion requires that the full two-week period elapse before one will know whether the messaging journey worked as intended. Also, if the testing reveals that the messaging journey is not properly configured, one would need to adjust the configuration of the journey and then engage in yet another two-week test before test results for the modified journey are available.

Some companies have attempted to obtain faster test results by deliberately modifying the time clock of the computer processor that is executing the messaging journey to try to quickly advance through the steps of a messaging journey to obtain test results. However, this approach is awkward and requires considerable computer expertise and intervention to accomplish rapid testing.

Thus, there is a need for a way to rapidly test a messaging journey that normally would occur over an extended period of time so that the individuals configuring a messaging journey can rapidly correct any configuration errors in the messaging journey. This would allow the individual that creates a messaging journey to more rapidly generate messaging journeys that are error free and that operate as intended.

DETAILED DESCRIPTION OF PREFERRED EMBODIMENTS

Figure 1:
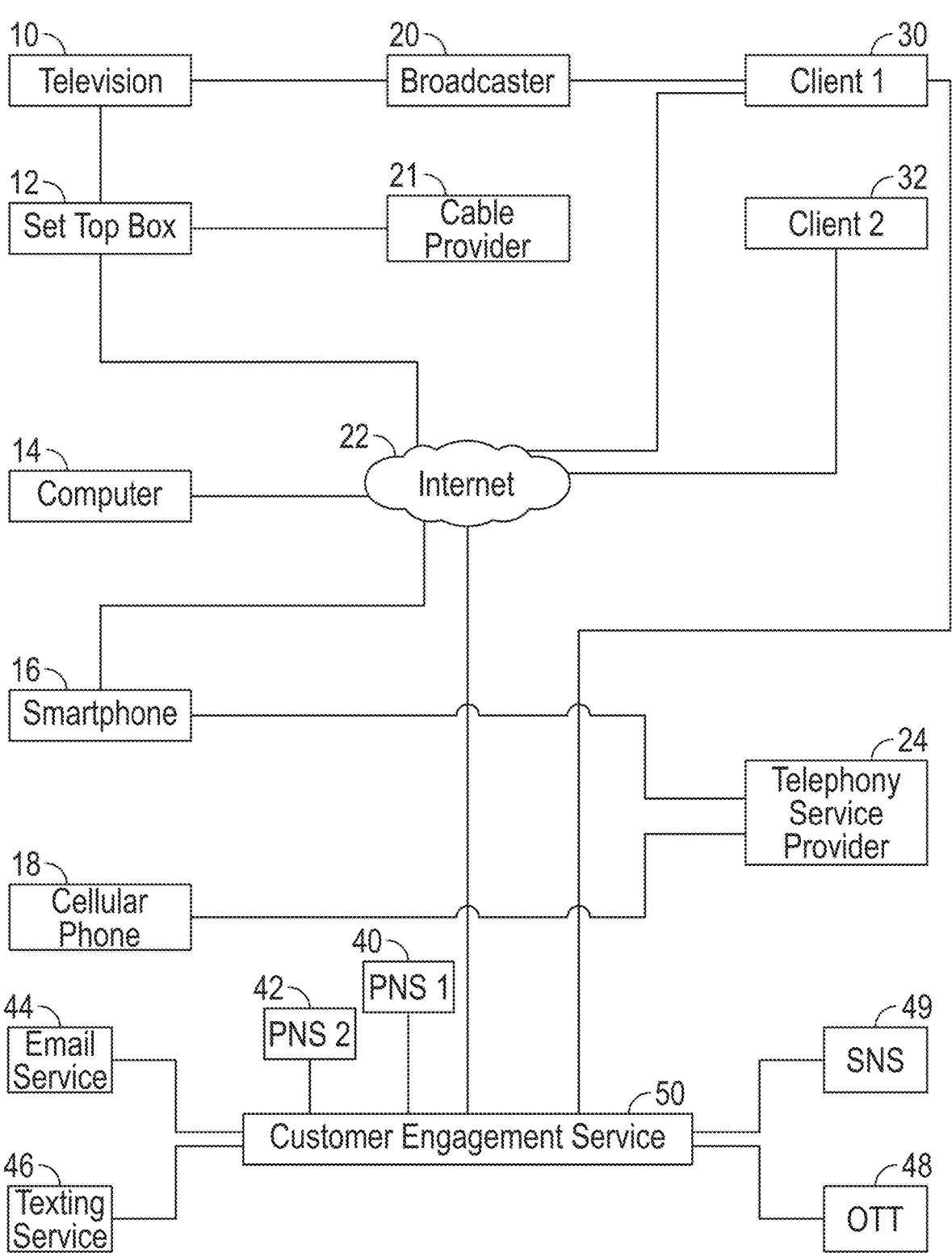
FIG. 1 is a diagram of a communications environment which could be utilized by systems and methods embodying the invention.

The following detailed description of preferred embodiments refers to the accompanying drawings, which illustrate specific embodiments of the invention. Other embodiments having different structures and operations do not depart from the scope of the present invention.

Systems and methods embodying the invention can be part of a customer engagement service. A customer engagement service helps a company interact with its users to enhance the customer experience and to increase the company's business, revenue and/or stature. One of the ways that a customer engagement service assists a company is by helping the company to manage how and when messages are delivered to the company's customers, and the content and form of those messages.

The following description refers to "clients" or "companies" and to "users". For purposes of this discussion, a "client" or a "company" would be a client of the customer engagement service. In other words, a client or a company is a business that is being assisted by the customer engagement service. "Users" are a client's or company's users, not users of the customer engagement service. The customer engagement service sits between a client or company and the client's or company's users to help draft messages and to help manage and orchestrate the delivery of messages sent from the client/company to its users.

A "message" could take many different forms and be delivered to a user in many different ways. For example, a "message" could be a mobile or browser-based push notification sent to users by a push notification service.

A message could also be an in-app message that is delivered to a user via a client's software application. The client's software application could be resident on a user's computer, a user's smartphone or any other device with a processor that is capable of running such a software application. The in-app messages generated and/or delivered by such a software application could be received by the user in various ways.

A message could also be presented to a user via a content card that is embedded within a company's software application or that is embedded within a company's website. If a content card is embedded in a company's software application, the software application itself would obtain content card data sets from a data service for the content cards that are embedded in the software application. The data service may or may not be part of a customer engagement service. The software application would then use the information in obtained data sets to present information, messages, images, sound recordings and possibly video to the user via the content card embedded in the company's software application.

In the case of content cards that are embedded in a company's website, a web browser software application would be responsible for presenting the website to the user. When a user navigates to a website that includes one or more embedded content cards, the web browser requests data sets for the embedded content cards from a data service. The web browser then uses information in the obtained data sets to present information, messages, images, sound recordings and possibly video to the user via the embedded content card.

For purposes of the following description and for purposes of the appended claims, a "software application" with embedded content cards will refer to both a traditional software application having embedded content cards, as well as a web browser that is presenting a page of a website that includes embedded content cards. Thus, references to a software application with embedded content cards will encompass a web browser presenting a page of a website with embedded content cards.

Messages could also be presented to a user while the user is using an augmented reality software application. In this instance, the customer engagement service and/or a client company could designate a plurality of message placement locations. The message placement locations would be real geographical locations. When a user operating an augmented reality software application aims a camera of his computing device such that one of the designated message placement locations is within the image being generated by the camera, a message could be displayed at the message placement location. The message displayed at the message placement location could be a static image, an animated image, or a video.

A message also could be a text message (SMS/MMS) that is delivered to users via a smartphone or via a text messaging software application. A message also could be a message delivered to a user via a social media service, or via an Over The Top (OTT) messaging service. A message also could be an email message that is delivered to users via standard email service providers. Moreover, a message could be an audio message delivered to a user via a telephony or VOIP service provider, or a video message delivered via similar means.

For purposes of the following description and the appended claims, any reference to sending a "message" to users is intended to encompass any of the different types of messages and delivery channels mentioned above, as well as any message types and delivery means that are developed in the future.

FIG. 1 illustrates a communications environment in which systems and methods embodying the invention could be practiced. As shown in FIG. 1, the communications environment includes client one 30, client two 32 and the customer engagement service 50. Client one 30 and client two 32 are clients of the customer engagement service 50. The clients 30/32 can communicate with the customer engagement service directly, via the Internet 22, or via other means.

Users of the clients 30/32 could utilize the clients' 30/32 services in various ways. For example, if client one 30 is a media company that provides media content to its users, client one 30 could produce media content that is sent via a broadcaster 20 to a client's television 10. That media content could be delivered to the user's television 10 via a set top box 12 that is connected to the user's television and to the Internet 22 and/or a cable service provider 21. In some instances, a software application on the set top box 12 that is provided by client one 30 could be used to deliver the content to the user's television 10.

The same or a different user might have a computer 14 that is connected to the Internet 22. The user could utilize a web browser on the computer 14 to access an Internet website provided by client one 30 that also offers media content. Similarly, a software application provided by client one 30 and that is resident on the user's computer 14 might also be used to access media content provided by client one 30 via the Internet 22.

Yet another user may have a smartphone 16 that is capable of communicating over the Internet 22 and/or via a telephony service provider 24. A software application provided by client one 30 and that is resident on the user's smartphone 16 could be used to access media content provided by client one 30 via the Internet 22 or via the telephony service provider 24.

The computer 14 and smartphone 16 may be capable of running an augmented reality software application. In that instance, a message could be displayed to a user if the user, operating the augmented reality software application, points a camera of the computer 14 or smartphone 16 such that a designated message placement location is within the image being generated by the camera. The message would be displayed at the designated message placement location.

Still another user might have a cellular telephone 18 that is capable of receiving text messages. This would allow the user of the cellular telephone to receive text messages from client one 30.

FIG. 1 also shows that a first push notification service (PNS) 40 and a second push notification service 42 could be used by the customer engagement service 50 to deliver push notifications to smartphones and/or web browsers. Such messages could be delivered by the push notification services 40/42 to user smartphones via the Internet 22 or via a telephony service provider 24 that provides a user's smartphone with its native telephony service.

FIG. 1 also shows that an email delivery service 44 could be used by the customer engagement service 50 to send email messages to users. Further, the customer engagement service 50 could use a text messaging service 46 to send text, audio and/or video messages to users, or an OTT messaging service 48 to send text, audio and/or video messages to users. Moreover, the customer engagement service 50 might send a message to users via one or more social networking services 49. Of course, the customer engagement service 50 could utilize any other message delivery service as well to communicate messages to users.

The clients 30/32 in this communications environment could be any sort of client that utilizes a customer engagement service 50 to help them manage engagement with their users. As noted above, a client could be a media broadcaster that produces and sends media content to its users. In other instances, a client could be a retailer whose purchasers are its users. In still other instances, the client could be a service provider, such as a telephony service provider or an Internet service provider. Virtually any business that wishes to send messages to its users could be a client in this environment.

One of skill in the art will appreciate that FIG. 1 only illustrates a very limited number of devices that would be used by users to receive messages from a client, and that could be used to interact with a client. In reality, there would be a very large number of user devices in such a communications environment. Also, a single user could possess and use multiple devices to access a client's services and to receive messages from a client. Thus, the depiction in FIG. 1 should in no way be considered limiting.

Figure 2:
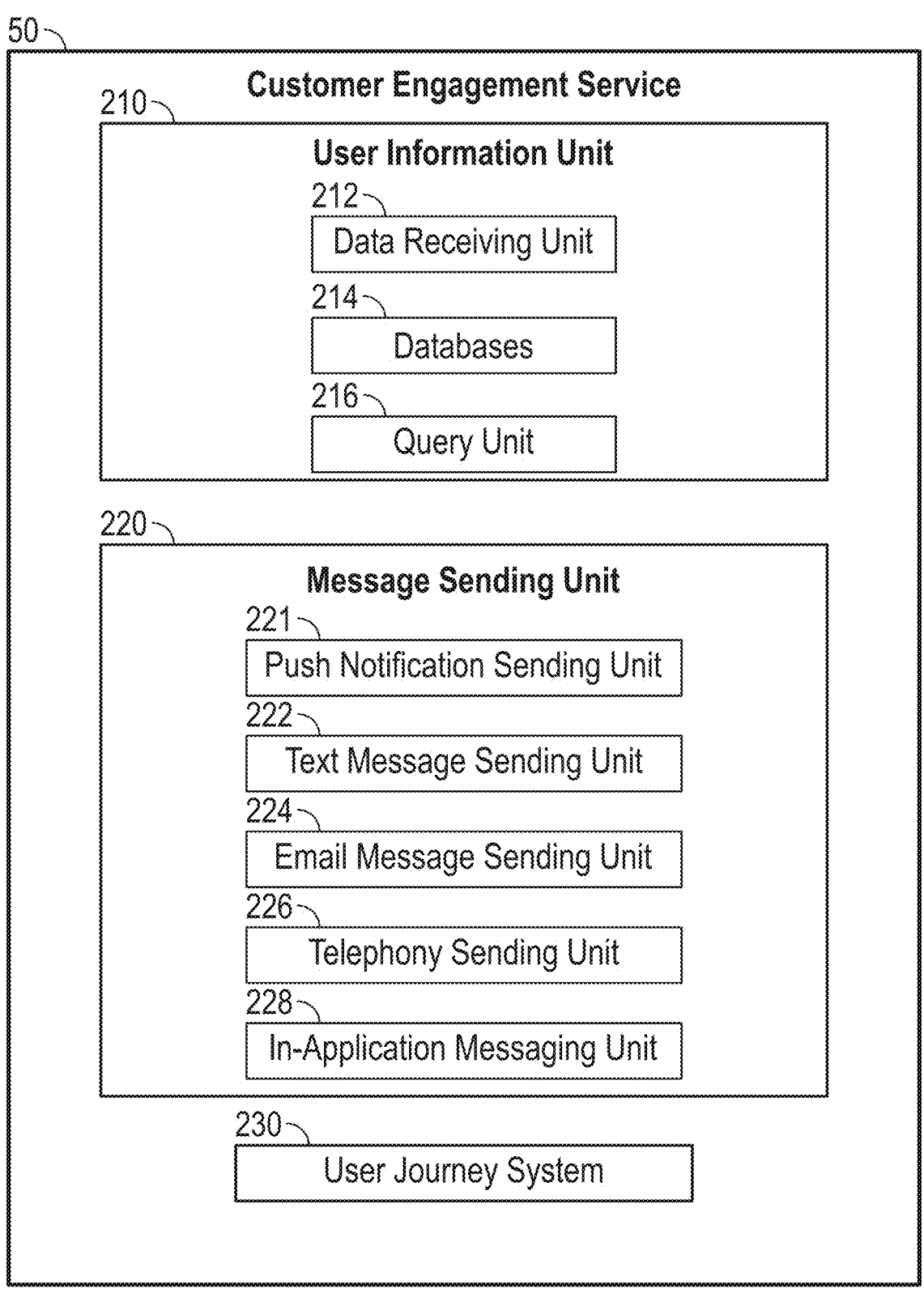
FIG. 2 is a diagram of selected elements of a customer engagement service.

FIG. 2 illustrates selected elements of a customer engagement service 50. The illustration in FIG. 2 is in no way intended to show all elements of a typical customer engagement service 50, and indeed there would typically be many other elements. Likewise, a customer engagement service 50 embodying the invention might not have all the elements illustrated in FIG. 2.

The customer engagement service 50 includes a user information unit 210 that is responsible for receiving and storing information about a client's users, and that is responsible for responding to requests for that stored information. The user information unit 210 includes a data receiving unit 212 that receives various items of information about users, and that stores that received information in databases 214. The information could be received from various sources. However, typically a client would provide information about its users to the data receiving unit 212 via various means.

For example, in some instances a client may send notifications to the data receiving unit 212 each time that one of the client's users engages with the client in some fashion. If the client is an online retailer, each time that a user makes a purchase from the online retailer the online retailer could send data about the purchase made by that user to the data receiving unit 212. As will be explained below, information received by the data receiving unit 212 may satisfy a trigger for causing an in-application message to be presented to a user.

In another example, if the client is a media broadcaster, and one of the media broadcaster's users logs onto a website provided by the media broadcaster to access media content, the media broadcaster could send data about that contact to the data receiving unit 212. The data sent could include an identification of the user, the time that the user accessed the website and an indication of what the user accessed or watched while logged into the website. Similarly, any time that a user accesses a client's website, the client could automatically report that user activity to the data receiving unit 212 of the customer engagement service 50.

In yet another example where the client is a media broadcaster, the media broadcaster could have provided a software application to a user that the user has loaded onto a smartphone or a computing device. The software application could be configured to report the actions that a user takes when using the software application directly to the data receiving unit 212 of a customer engagement service 50. Indeed, in any instance where the client has provided a software application to its users, the software application could be configured to report user activity to the data receiving unit 212 of the customer engagement service 50.

The databases 214 could include one or more journey metadata databases that includes information about how individual users have progressed though defined "journeys", as will be discussed below. Thus, when it is necessary to determine what messaging to send to a particular user, the system may consult the journey metadata database to acquire information about a user's present position in a journey, to thereby determine what message or messages should now be presented to the user via a content card according to the journey rules/parameters.

Because clients and software applications that the clients provide to their users all report user activity to the customer engagement service 50, the customer engagement service 50 is able to build a detailed picture of each user, the user's preferences, and the user's typical courses of action.

In addition, because the customer engagement service 50 is tasked by its client with the delivery of messages to the client's users, the customer engagement service 50 is also able to build up a record of how and when individual users react to a sent message. This could include an indication of when a user opens a sent message after delivery, and whether and when the user takes an action in response to receipt of a message. For example, because the data receiving unit 212 is also receiving information from the client regarding a user's contact with the client, the customer engagement service 50 may learn that shortly after an individual user received a message from the client, the user logged into the client's website, or that shortly after the user received a message, the user opened a software application provided by the client. For all of these reasons, the customer engagement service 50 is able to build detailed user profiles that can be used to predict how individual users will act in certain situations, or how they will respond to certain forms of messaging.

As shown in FIG. 2, the user information unit 210 also includes a query unit 216. The query unit 216 queries the databases 214 to obtain various items of information about the users.

The customer engagement service 50 also includes a message sending unit 220. The message sending unit 220 is responsible for sending messages to a client's users, or perhaps more accurately for causing messages to be sent to a client's users. As explained above, messages could take many different forms and have many different delivery channels. The message sending unit 220 includes a push notification sending unit 221 that causes mobile or browser-based push notifications to be sent to users via one or more push notification services 40/42, as illustrated in FIG. 1. The push notification sending unit 221 may obtain telephone numbers and push notification service credentials for individual users from the databases 214 with the assistance of the query unit 216. Alternatively, the client may provide that information to the message sending unit 220. The user credential information is then used to cause one or more push notification services 40/42 to deliver a push-notification message to the users.

The message sending unit 210 may also include a text message sending unit 222 that causes messages to be sent to users via typical text messaging channels. As is known to those of skill in the art, traditional text message delivery channels are now often capable of delivering both text-based messages, as well as audio messages and video messages. The text-based, audio and/or video messages could be delivered via traditional SMS/MMS messaging channels, or such messages could be delivered to users via an OTT messaging service or perhaps a social networking service. Information needed to send such messages to users may also be obtained from the databases 214 of the user information unit 210, or that information may be provided by the client. Here again, the message sending unit 220 can enlist the services of one or more message delivery platforms to actually send the message to users.

The message sending unit 220 may also include an email message sending unit 224 that causes email messages to be sent to users. The email message sending unit 224 may obtain email addresses and other information, such as usernames, for individual users from the databases 214 with the assistance of the query unit 216, or that information may be provided by the client. The information is then used to send email messages to users. The email messages may be delivered to users by one or more third party email services.

The message sending unit 220 may also include a telephony sending unit 226 that is responsible for delivering audio messages to users via a telephony system. For example, the telephony sending unit 226 could generate an audio recording of a message that is to be delivered to users, or the telephony sending unit 226 could receive such an audio message directly from the client. The telephony sending unit 226 would then obtain information about individual customers from the databases 214 with the assistance of the query unit 216, such as user telephone numbers and usernames, or that information could be provided by the client. The telephony sending unit 226 would then enlist the aid of an outside service to deliver the audio message to users via a traditional or VOIP telephony system.

In some instances, the telephony sending unit 226 could generate and operate interactive voice response (IVR) applications to deliver such audio messages to users. Doing so may allow a user to request and receive information or services in addition to the original audio message. If a user does interact with an IVR application, how the user interacts with the IVR application could also be recorded in the databases 214 as additional information about the user.

The message sending unit 220 further includes an in-application messaging unit 228. The in-application messag-ing unit 228 is responsible for causing messages to be delivered to a user via a client's software application that it provides to its users. For this reason, the in-application messaging unit 228 can interact with an instantiation of a client's software application that is resident on a user's computing device.

As illustrated in FIG. 2, the customer engagement service 50 includes a user journey system 230 which is used to set up, test and conduct messaging journeys. Details on the user journey service 230 and how it operates are provided below.

One of the ways that a customer engagement service 50 can assist a client company in interacting with users is by setting up and executing "campaigns" or "journeys". A campaign would typically involve only a single step, whereas a journey is configured to deliver a series of messages to a user over an extended period of time in a series of steps. In the case of a journey, the messages often are designed to be presented to a user in a particular order. In other instances, the order in which the messages are presented to a user is not important. The period of time over which a journey extends could be a few hours, a few days, a few weeks or even longer.

A step of a journey could be configured to send or not send a particular type of message to a user via a particular messaging channel. The logic controlling the decision of whether to send the message, and if it is sent what to include in the message would be encoded into the step of the journey. If information is required to decide whether to send the message or to determine what to include in the message, part of performing the step would include obtaining that information and applying it based on the encoded logic of the step to determine how to perform the step.

Messaging Journeys can have multiple different paths that a user could traverse, and the path that a user takes through a journey can be determined, in part, on actions that the user takes or fails to take.

For purposes of the following discussions, we will uniformly refer to messaging "journeys." However, the term "journey" in this context is intended to cover journeys, as well as other similar structured ways of delivering one or more messages to a user over an extended period of time. A detailed example of a messaging journey is explained below, along with a description of how the steps of the journey are performed.

A step of a journey may include logic defining a filter or a "trigger" that must be satisfied before one or more messages are presented to a user, or before the user is permitted to progress to the next step of the journey. The filter or trigger may also determine which of multiple branches of the journey the user is to progress along.

A filter could be based on characteristics of the user and require that the user be a member of a segment of users. A segment of users could be something like males having an age in the 20-35 year old range. Thus, a step of a journey that is based on a filter could result in a message being sent or not being sent depending on whether the user falls within a defined segment of users. Likewise, whether a user is part of a segment of users could determine whether the user is sent down a first path or a second path through the journey.

A filter could also be reflective of actions that a user has taken or not taken. For example, a step of a journey could be configured to send a particular type of message to a user if the user has made one or more purchases from a website within a predetermined period of time. Similarly, a step could cause a user to proceed along a first path through the journey if the user has taken a particular action, or proceed along a second different path through the journey if the user has not taken the particular action.

A trigger could require that the user has already seen a first message in the journey before a second message is presented to the user. Steps of a journey could include other sorts of triggers based on other things, such as the actions of the user or the actions of third parties.

A step of a journey may also involve waiting for a specified delay period to expire. For example, a step of a journey could require that one day elapse since the user entered the step before the user progresses to the next step in the journey.

A step of a journey could also specify how a certain message is to be presented to a user. For example, a first step of a journey could specify that a user is to receive a first message as an in-application message that is presented to the user while the user is engaged with a client's software application. A second step of the journey could specify that the user is to receive a second message as a text message. A third step of the journey could specify that a user is to receive a third message via email. Thus, the steps of a journey could specify not only what messages are to be presented to a user and when the messages are to be presented to a user, but also how those messages are to be presented to the user.

A step of a journey can be a branching step where a user is sent down one of multiple different branches of a journey. If information is required to determine which branch the user should be sent to, part of performing the step would be obtaining the necessary information and evaluating the logic of the step using the obtained information. Here again, filters or determining whether the user is a member of a defined segment can be used to determine along which branch the user progresses.

In some instances, a step of a journey could involve monitoring to determine when a user takes a particular action. And once the user performs the action, the user could then be progressed on to the next step of the journey.

An "experimental" step of a journey may be configured to randomly send the user down one of multiple paths, but according to rules. For example, a step of a journey may be configured to send 50% of users down a first branch and 50% of users down a second branch. In this instance, the system controlling the execution of the journey for multiple users would need to possibly coordinate how the step is performed for all users to ensure that 50% of the users are sent down the first branch and that 50% of the users are sent down the second branch.

In many instances, the customer engagement service 50 provides a user interface that allows personnel at client companies to design, edit and implement messaging journeys. In other instances, an individual within the customer engagement service 50 could design, edit and implement a messaging journey the direction of a client company.

Because steps of a journey must be completed in a particular order according to the structure and logic of the steps of the journey, it is necessary to track what steps a user has completed, and often the actions that the user has taken along the way or the messages that a user has seen along the way. Information about how a user has progressed through a journey is stored in a journey metadata database. The journey metadata database can be part of the databases 214 of the user information unit 210 of the customer engagement service 210 illustrated in FIG. 2. Alternatively, the journey metadata database can be part of the user journey system 230, details of which are discussed below.

A step of a journey can be configured to remotely change the setting of a feature flag in order to change a particular user's experience with a software application or a website. In the following description, we will refer to a step of a journey that causes a feature flag setting to be changed as a "feature flag step."

Regardless of how a user arrives at a feature flag step of a journey, when the user arrives at the feature flag step the setting of a feature flag for that user within a software application or a website will be changed from a first value to a second value. As explained above, changing the setting of a feature flag in an application or website for the user would typically result in changing how the user experiences the subject software application or website.

When a user arrives at a feature flag step of a journey, the feature flag step can operate to both change the setting/value of a feature flag for the user and to cause messaging relating to the change in the feature flag setting to be sent to the user. The messaging related to the change in the feature flag setting can highlight or explain to the user how the user's experience with the relevant software application or website will change as a result of the change in the setting of the feature flag.

When an entity uses feature flag steps of journeys to change the settings of feature flags for users, the entity does not need to export user data from a software application or a website in order to identify those users for whom a feature flag setting has changed in order to know which users should receive messaging relating to the feature flag setting change. Instead, when the user arrives at a feature flag step of a journey, the feature flag step handles both the change in the setting of the relevant feature flag and the transmission of messaging to the user related to the feature flag setting change. This greatly simplifies what the entity must do to ensure that relevant messaging is sent to users affected by a feature flag setting change. In addition, it ensures that messaging relating to a feature flag setting change is timely sent to the user as soon as the feature flag setting changes.

Figure 3:
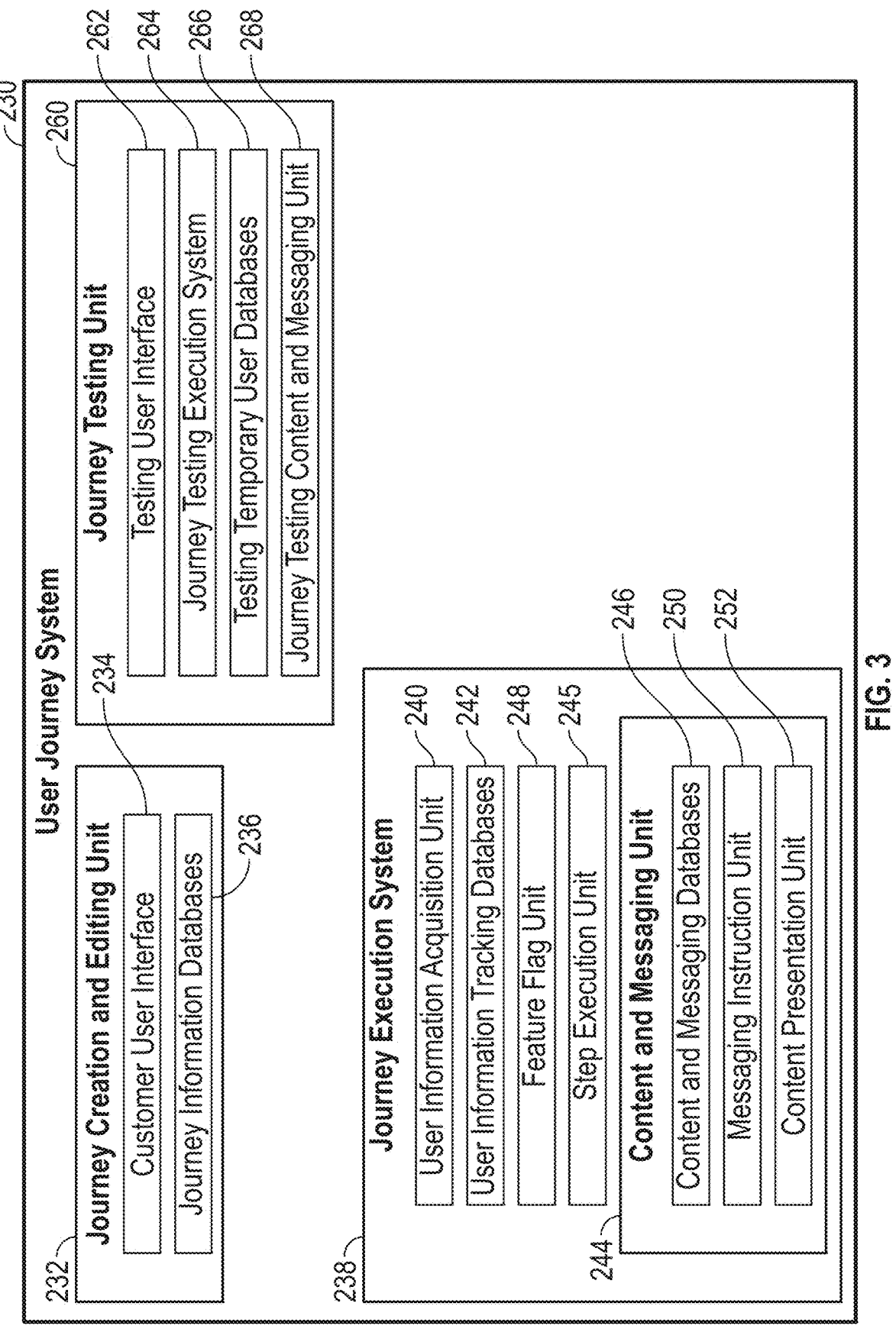
FIG. 3 is a diagram illustrating selected elements of a user journey system that can be part of a customer engagement service.

FIG. 3 illustrates selected elements of a user journey system 230. Personnel at a client company making use of a customer engagement service 50 can utilize the user journey system 230 to set up, edit and test user messaging journeys. The user journey system 230, often in combination with other elements of the customer engagement service 50, then implements or executes those journeys.

The user journey system 230 includes a journey creation and editing unit 232. This includes a customer user interface 234 which is used by personnel within a client company or personnel with a customer engagement service 50 to create, edit and implement journeys. This typically would involve using the customer user interface 234 to define each step in the journey.

As mentioned above, there are different types of steps that can accomplish different types of operations. Some steps could be configured to cause a message to be sent to a user. The logic of the step, as defined by the individual creating the journey, would determine under what conditions the message is to be sent. The logic of the step could also determine what information is included in the message and the messaging channel through which the message is delivered to the user.

In some instances, a messaging step would result in a message being automatically sent when the user arrives at the step. In other instances, a step of a journey may require that a user take a certain action before progressing on to a second step which calls for a message to be sent to the user. In that instance, the message is not sent until the user performs a certain action. Also, if the user does not perform the action for a predetermined period of time, as defined by the logic of the first step, the user may be sent on to another step of the journey without a message being sent to the user.

Also, the logic of steps of a journey may dictate that various external actions or events are the trigger for sending a message to a user. This could be as simple as the occurrence of a particular time and date, or the occurrence of some outside event which has relevance to the messaging.

In some instances, completing a step of a journey could require a user to acquire certain knowledge or perform a certain action. In such instances, the user would not progress onto the next step of the journey until the trigger for progressing has been satisfied.

The way in which a step of a journey is completed can vary greatly depending on the context and the needs of the client company. Thus, the examples given above should in no way be considered limiting.

As depicted in FIG. 3, the journey creation and editing unit 232 also includes journey information databases 236. These databases 236 can include information defining journeys that have been set up for a client company. The databases 236 can also track information about how individual users are progressing through a journey. This can include which steps have been performed, as well as what choices a user may have made or what actions a user has taken along the way during the various steps.

The databases 236 may also include copies of messaging that is to be presented to users as the users progress through a journey. In alternate embodiments, the information to be presented to users during steps of a campaign or journey could be stored elsewhere. Similarly, the databases 236 may contain information about the messaging that has been sent to a user, to include the content, the delivery channel and sometimes an indication of whether the user opened or viewed the messages.

As explained above, certain steps of a journey could be feature flag steps which are configured to cause a change in a setting of a feature flag for the user who arrives at the feature flag step. Also, arrival at a feature flag step could trigger the delivery of messaging to the user relating to the change in the feature flag setting.

In some instances, a feature flag could have only two setting values, such as true/false or yes/no settings. In other instances, a feature flag could be set to multiple different values, where each different value results in the user having a different type of experience with the relevant software application or website.

A first feature flag step could be configured such that when a user arrives at the first feature flag step and the relevant feature flag setting changes from a first value to a second value, a first type of messaging is automatically sent to the user. Such messaging could inform the user that a new type of content or a new type of functionality is now available to the user.

A second feature flag step of a journey could be configured to change the setting of the same feature flag from the second value back to the first value. When a user arrives at that second feature flag step, in addition to changing the value of the feature flag back to the first value, the feature flag step could cause a second type of messaging to be user to the user. The second type of messaging would inform the user that certain content or functionality is no longer available to the user.

In some instances, a feature flag of a software application or website could take on more than two values. In this situation, a feature flag step can be configured to change the setting of a feature flag to any of multiple different values. The value to which the feature flag is set by the feature flag step can vary depending on various factors. In some instances, the path taken by the user to arrive at the feature flag step could determine how the setting the feature flag is changed. In other instance, the occurrence or existence of some factor at the time the user arrives at the feature flag step could determine the value to which the feature flag is changed. In other instances, actions taken by the user or actions taken by a third party could have an influence over how the value of the feature flag is changed by the feature flag step. Thus, a feature flag step can be highly configurable to cause the value of a feature flag to change based on any number of factors.

In instances where a feature flag step is capable of changing the setting of a feature flag to multiple different values, there could be messaging that is associated with each different value to which the feature flag can be set. When the feature flag step operates to change the setting of a feature flag to a first value, the feature flag step also causes a first type of messaging to be sent to the user. If the feature flag step operates to change the setting of the feature flag to a second value, the feature flag step also causes a second type of messaging to be sent to the user. Thus, a feature flag step could be configured to send a variety of different alternate messaging to a user depending on how the feature flag step changes the value of the feature flag.

Feature flag steps of journeys could be configured so that messaging is only automatically transmitted to a user when the feature flag setting changes from a first value to a second value. In other instances, a feature flag step of a campaign or journey could be configured such that every time the setting of a feature flag changes, some type of messaging is sent to the user.

As illustrated in FIG. 3, the user journey system 230 further includes a journey execution system 238 which is responsible for actually implementing or executing journeys. The journey execution system 238 includes a user information acquisition unit 240. The user information acquisition unit 240 is responsible for obtaining information relevant to individual users and for storing that information in user information tracking databases 242.

As explained above, in various journeys the actions that a user takes may affect how the journey progresses. For example, it may be necessary for a user to take certain actions or to acquire certain information in order to progress from one step of a journey to the next. The user information acquisition unit 240 would be responsible for determining when the user takes those actions, and for then storing information about the user's actions in the user information tracking databases 242. As noted above, information about user actions is then used to control how a user progresses through a journey.

Also, a user may need to make certain selections as they progress through a journey. Information about what selections a user has made along the way may also be captured by the user information acquisition unit 240 and information about those selections can be stored in the user information tracking databases. 242.

Moreover, the actions that a user takes and the selections a user makes while progressing though a journey can influence what messaging is presented to a user. Knowing what messaging has already been presented to a user can influence what additional messaging is presented to the user during subsequent steps of a journey. Thus, the user information tracking databases 242 may also include information about the messaging that has already been presented to a user as the user has progressed through a journey.

The journey execution system 238 further includes a feature flag unit 248. The feature flag unit 248 is responsible for causing the settings of feature flags to change when a user arrives at a feature flag step of a journey. The feature flag unit 248 may also track the current settings of each of the feature flags being controlled by feature flag steps of journeys.

As explained above, a feature flag step could include some controlling logic that indicates how the setting of a feature flag is to be changed based on various factors. The feature flag unit 248 is responsible for implementing that logic when a user arrives at a feature flag step to both determine the value to which a feature flag setting should be changed, and for causing the feature flag setting to be changed to the determined value The logic of a feature flag step which determines how the setting of a feature flag should be changed may depend on previous actions taken by a user or by what messaging a user has already seen. As a result, the feature flag unit 248 may obtain information from the journey databases 236 and/or the user information tracking databases 242 to determine the value to which a feature flag setting should be changed when a user arrives at a feature flag step of a journey.

The journey execution system 238 also includes a step execution unit 245, which is responsible for actually causing a step of a journey to be performed or enacted. The step execution unit 245 evaluates the requirements of a step and then causes appropriate actions to occur.

For example, if a step of a journey is a messaging step, the step execution unit 245 evaluates the logic of the step to determine whether a message should be sent to a user, and if so, what the message should include. If a message is to be sent to the user, the step execution unit 245 directs the content and messaging unit 244, which is discussed below, to create and cause a message to be delivered to the user.

If a step of a messaging journey is a branching step, the step execution unit 245 evaluates the logic of the step and obtains the information needed to determine along which branch the user should be sent. The step execution unit 245 then evaluates the obtained information based on the step logic and then progresses the user down the correct branch.

If a step of a method is an "experimental" step, where a certain percentage of users are sent down one branch and another percentage of users are sent down a different branch, then the step execution unit 245 evaluates the logic of the experimental step and takes action to send the user down the appropriate branch of the journey according to the configuration or logic of the experimental step.

Various steps can be configured to operate in various different ways. Regardless, it is the function of the step execution unit 245 to determine how to implement or perform the step, and to then cause appropriate actions to occur so that the step is performed or implemented in accordance with the configuration and/or logic of the step.

The journey execution system 238 further includes a content and messaging unit 244. The content and messaging unit 244 includes content and messaging databases 246 which would store content and messaging which is to be delivered to the users as part of performing the steps of a journey.

The content and messaging unit 244 further includes a messaging instruction unit 250 which is configured to send instructions for the delivery or presentation of messaging to a user according to the steps of a journey. The messaging instruction unit 250 is responsible for causing the correct messaging to be sent to a user via the correct messaging channel as part of performing the steps of the journey.

The messaging instruction unit 250 is primarily responsible for creating an instruction that will cause certain messaging to be sent to one or more users. The messaging instruction unit 250 itself does not accomplish the transmission or sending of messaging. Instead, the messaging instruction unit 250 sends instructions to one or more elements of the message sending unit 220 of a customer engagement service 50 in order to cause messaging to be sent to the users. However, the messaging instruction unit 250 may pull content from the content and messaging databases 246 and use that information to instruct one or more elements of the message sending unit 220 to send or present an appropriate message to a user.

In some instances, the content and messaging unit 244 would also include a content presentation unit 252 which causes certain content to be presented to one or more users as part of performing a step of a journey. This could occur, for example, when it would be appropriate to present certain information or messaging to a user within a client's software application. Alternatively, if a user is viewing a virtual reality or augmented reality space, messages may be presented to the user via the virtual/augmented reality system.

The distinction between the content presentation unit 252 and the messaging instruction unit 250 is that the content presentation unit 252 would be responsible for causing content to be presented to users via a software application or a virtual or augmented reality system. In contrast, the messaging instruction unit 250 is responsible for causing a message to be delivered to a user via one or more of multiple different messaging delivery channels.

The user journey system 230 also includes a campaign testing unit 260. The campaign testing unit 260 allows a tester to progress through the steps of a messaging journey to ensure that the messaging journey is operating correctly and generating appropriate messaging.

The campaign testing unit 260 includes a testing user interface 262 which will be described in greater detail below. The testing user interface 262 provides a mechanism for the tester to provide information necessary to test a particular journey. This can include identifying the journey to be tested, identifying which user's information to use for the test, identifying a start date and time for the test and identifying where to send messages generated by the journey while performing the test. The testing user interface 262 can also be used to provide input about how to perform individual steps of a journey as the test progresses.

The testing user interface 262 may also provide a graphical illustration of the steps of a messaging journey which is under test. As the tester progresses through the steps of the messaging journey, each newly performed step is illustrated or perhaps highlighted in the testing user interface 262. In addition, the testing user interface 262 provides information about how each of the individual steps are performed.

When a messaging journey is actually being performed for a user, the information necessary to perform the steps would typically be provided by information in databases. Also, user actions which are taken or performed by the user as the messaging journey progresses can be used to influence how the individual steps are performed and how the user traverses the messaging journey.

When a messaging journey is being tested by the campaign testing unit 260, no user actions can actually be performed. Instead, the tester is queried for how the tester would like the user to perform the relevant step. Information provided by the tester via the testing user interface 262 is then used in lieu of actual user actions to perform the individual steps. Examples of this are provided below.

Similarly, in some instances information about a user's past actions would be used to determine how to perform a step of a journey. For example, a step of a journey could be a branching step where a user is progressed along a first branch if the user has made three or more purchases from a website over the last 10 days, or is progressed along a second branch if the user has not made three or more purchases from the website over the last ten days.

If a journey being tested is configured to transpire over two weeks, and the branching step mentioned above appears twelve days into the journey, then it would be virtually impossible to rely on actual user data to determine which branch the user should progress along. Because the step in question appears twelve days into the journey, the user will not have had an opportunity to respond to the earlier steps of the journey by making purchases before the user arrives at the relevant step during day twelve of the test. For these reasons, the tester may be queried via the testing user interface 262 as to whether the user should be considered to have made more than three purchases from the website over the last ten days. Then, based on the tester's input, the user would be progressed along the appropriate path so that the test of the journey can continue.

The campaign testing unit 260 further includes a journey testing execution system 264 which would be responsible for performing the steps of a messaging journey under test. The journey testing execution system 264 may obtain information about an individual user from existing user information databases in order to perform individual steps of a messaging journey. For example, the journey testing execution system 264 may obtain data from databases 214 of the user information unit 210, or from user information tracking databases 242 to determine how to perform a test. However, the journey testing execution system 262 will not overwrite any existing user information in these databases while performing a test of a messaging journey. Instead, to the extent performing a step of a journey would normally result in modifying user data within existing databases, the journey testing execution system 264 will instead record that information in testing temporary user databases 266.

To the extent that a user's actions performed during a first step of a messaging journey under test affects how a later step of the messaging journey is to be performed, information in the testing temporary user databases 264 is consulted to determine how the user acted during the previous step. By storing information about user actions that occurred during a messaging journey that is under test in the testing temporary user databases 266, one can accurately perform each of the steps of the messaging journey under test without affecting actual user information in existing user information databases.

The campaign testing unit 260 further includes a journey testing content and messaging unit 268. The journey testing content and messaging unit 268 is responsible for causing messaging to be generated while performing a step of messaging journey that is under test.

As will be explained below, when a tester initiates the test of a messaging journey, the tester can specify an email address or perhaps a telephone number to which messages will be sent during the test. In other words, when a messaging journey is being tested, and it is being tested in connection with how an actual individual user would experience the messaging journey, rather than having messages generated during the test sent or displayed to the identified actual user, the tester can instead have messages generated during a test sent to a separate testing email address or to a testing text messaging destination so that the tester can review the messages generated during the test to ensure they were accurately created and sent via the correct messaging channel.

Figure 4:
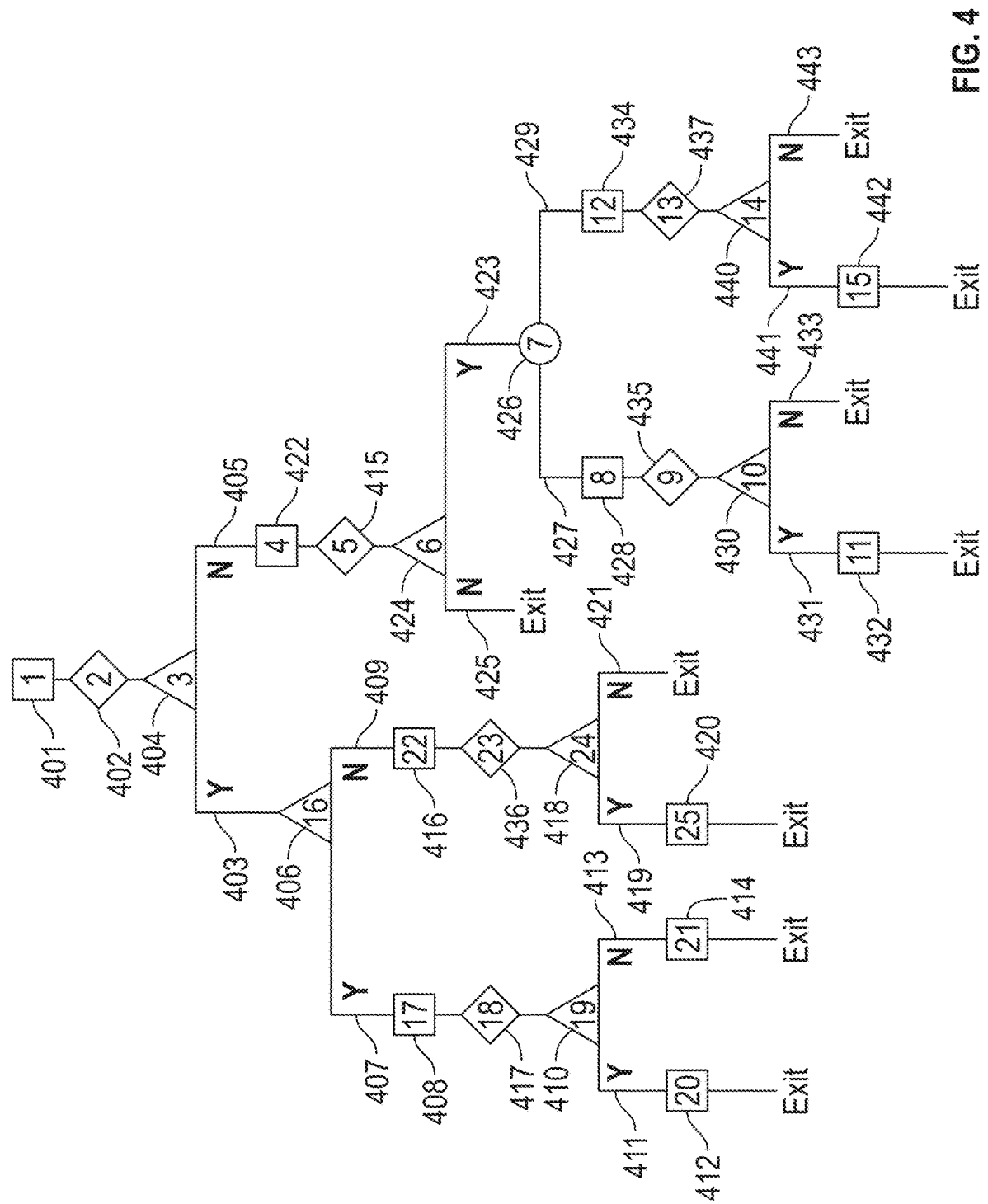
FIG. 4 is a diagram of a messaging journey.

FIG. 4 is a graphical depiction of a messaging journey. This messaging journey will be described to provide an example of how a typical messaging journey is configured and how it would operate to deliver messages to an individual user. This example messaging journey includes steps which are configured to operate in specific ways. The ways in which the steps of the messaging journey depicted in FIG. 4 operate are not the only ways in which steps of the messaging journey can operate. Steps of the messaging journey could also operate in a variety of different ways which are not depicted in FIG. 4 and which are not described in the following explanation. As a result, the depiction of FIG. 4 and the following description of one example messaging journey should in no way be considered limiting. Messaging journeys could operate in a variety of additional ways which are not part of the messaging journey depicted in FIG. 4.

In the messaging journey depicted in FIG. 4, each of the steps of the messaging journey are numbered and represented by a geometric design such as a square, a triangle, a circle or a diamond. Steps depicted as a square are steps in which a message may or may not be sent to a user, depending upon circumstances and the logic of the step. Steps which are depicted as a triangle are branching steps where a user could be sent down one of two or more alternate branches of the messaging journey. The decision about which branch a user should progress along can depend on the logic of the step, upon user's actions, upon user characteristics and a variety of other features, as will be explained below.

Steps which are depicted as a circle are "experimental" steps. In an experimental step, a user is directed down one of multiple different alternative branches of the messaging journey according to the configuration of the experimental step. Often in an experimental step users are randomly selected to progress along one of the different branches which extend from an experimental step. For example, in the depiction in FIG. 4, experimental step 5 could progress fifty percent of all users down the first branch 427 and progress the other fifty percent of all users down the second branch 429. However, the experimental step could be configured to progress users to the available branches according to a different percentage. For example, experimental step 5 could be configured to progress twenty percent of users along the first branch 427 and to progress the other eighty percent of users down the second branch 429. The way in which an experimental step operates simply depends upon how the experimental step is configured.

An experimental step could include additional logic beyond simply progressing a certain percentage of users down each of the available branches. For example, an experimental step could be configured to hold all user at the step until 24 hours pass, then progress users down the branches according to specified percentages. Or an experimental step could be configured to immediately send 50 percent of users down a first branch, but hold the other 50 percent of users for 24 hours before progressing the other 50 percent of users down the second branch. Filters and segment limitations may also be part of the logic of experimental steps.

Steps which are depicted as a diamond are delay steps in which the user would normally he held at the step for a specific period of time before progressing to the next step. As will be explained below, when one is testing a journey, there is no associated time delay in the testing. The user simply hits the delay step and then instantly progresses onto the next step as if the delay period had been satisfied.

The messaging journey depicted in FIG. 4 is one which would be performed for users as they are introduced to a new retail website that offers goods and/or services for sale. The messaging journey would typically be created and used by the operator of the website in an attempt to increase sales via the website.

The messaging journey begins in Step one 401, which is a messaging step. Step one 401 involves sending a welcome message to a user who has logged onto a new retailing website for the first time. The welcome message sent in step one 401 could be conveyed to the user via a variety of different transmission paths. In some instances, the welcoming message would be sent via an email message. In other instances, the welcoming message could be sent via a text messaging channel. In yet other instances, the welcome message could be part of an in-application message which is displayed to a user as the user is using a software application.

Step two 402 is a delay step in which the user must wait twenty-four hours before progressing onto step three 404.

Step three 404 is a branching step in which a user could be directed down two alternate branches 403, 405 of the messaging journey. In Step three 404, the system determines whether or not the user has logged onto the website since receiving the welcome message sent in Step one 401. If the system determines that the user has logged onto the website, the user is progressed along the first branch 403 of the messaging journey. If the user has not yet logged onto the website, the user is progressed along the second branch 405 of the messaging journey.

Assuming the user has logged onto the website, and the user is directed down the first branch 403, the user then arrives at step sixteen 406, which is another branching step. In Step sixteen 406, the system determines whether the user has made a purchase on the website. If the user has made a purchase on the website, the user is progressed along branch 407 of the messaging journey. If the user has not yet made a purchase on the website, the user is progressed along branch 409.

As mentioned above, the information used to answer the question of whether the user has made a purchase on the website could come from actual user data for the user that was identified at the beginning of the test. Alternatively, the tester could be asked via the testing user interface 262 whether, for purposes of the test, the user should be considered to have made a purchase on the website. In that instance, the response from the tester would be used to determine in step sixteen 406 whether to progress the user down branch 407 or branch 409.

The decision about whether to use actual user data to decide how to execute the steps during a test, or to instead use information provided by the tester, could be determined at the beginning of the test by the tester. In other words, this could be a setting that the tester selects before the test of a journey is run.

It is also worth noting that if the test is being conducted such that the tester provides input that is used to perform a first step of the journey being tested, this same information may be reused later during the test to determine how to perform a subsequent step. Information input by the tester is stored in the testing temporary user databases 266 so that it can be reused later to determine how to perform a subsequent step during the test of the journey. This also prevents the tester's input from overwriting information in actual user databases.

Assuming the user has made a purchase on the website, and the user has been directed down branch 407, the user then arrives at Step seventeen 408. Step seventeen 408 is another messaging step. In Step seventeen 408, and because it was determined in step sixteen that the user had made a purchase on the website, the user is sent a thank you message. The user then progresses onto step eighteen 417, which is another delay step. During step eighteen 417 the user is delayed 24 hours before progressing onto step nineteen 410.

Step nineteen 410 is another branching step and the question to be resolved at Step nineteen 410 is whether the user has made two or more purchases in the last three days via the website. The system could consult information about user activity stored in user databases to answer that question, or ask the tester to make a determination about whether the user has made two or more purchases in the last three days.

If the user has made two or more purchases in the last three days, this would indicate the user has a relatively high degree of interest in the website. As a result, the user is progressed down branch 411 to Step twenty 412. At Step twenty 412, a message advertising for goods similar to the goods that the user has already purchased is sent to the user. The user then exits the messaging journey.

Assuming that the performance of Step nineteen 410 determined that the user had not made two or more purchases in the last three days, the performance of Step nineteen 410 would have resulted in the user being progressed down branch 413 of the messaging journey. As a result, the user would have arrived at Step twenty one 414 In Step twenty one 414, a message providing a discount for future purchases on the website would be sent to the user, and the user would then exit the messaging journey.

Returning now to Step sixteen 406, if the performance of Step sixteen 406 had determined that the user had not made a purchase from the website, the user would have been progressed down branch 409 of the messaging journey. As a result, the user would have arrived at Step twenty two 416. At Step twenty two 416, a message providing a discount for future purchases on the website would be sent to the user in an attempt to entice the user to log onto the website and make a purchase. The user would then progress to step twenty three 436, which is a delay step. The user would be held at step twenty three 436 for a 24 hour delay before the user is allowed to progress onto Step twenty four 418. In Step twenty four 418, the system determines whether the user has made a purchase on the website. If so, the user is progressed along branch 419 to arrive at Step twenty five 420. In Step twenty five 420, a message advertising for the same type of goods that the user has already purchased would be sent to the user, and the user would then exit the messaging journey.

If the performance of Step twenty four 418 indicated that the user had not made a purchase on the website, the user would is progressed along branch 421 and the user exits the messaging journey.

Returning now to Step three 404, if the performance of Step three 404 indicated the user had not yet logged on to the website after receiving the initial welcoming message in step one 401, the user would be progressed down branch 405 of the messaging journey. The user would then arrive at Step four 422, where a message reminding the user to log onto the website would be sent to the user. The user would then progress onto step five 415, which is a delay step. Step five 415 involves a 24 hour delay before the user is allowed to progress on to Step six 424.

In Step six 424, the system determines whether or not the user has logged onto the website. If not, the user is sent down branch 425 and the user exits the messaging journey. If performing Step six 424 determines that the user has logged on to the website, the user is sent down branch 423 to arrive at Step seven 426.

As mentioned above, Step seven 426 is an "experimental" step. In this instance, Step seven 426 is configured to send fifty percent of all users down the branch 427 and the other fifty percent of the users down branch 429. While Step seven 426 is configured to send fifty percent of all users down each of the two branches, Step seven 426 could be configured in various other ways. For example, Step seven 426 could be configured to send twenty percent of users down branch 427 and the other eighty percent down branch 429.

The performance of a test of a journey could be configured to randomly determine which of the available branches the user should progress along at an experimental step. Alternatively, the journey testing execution system could be configured to ask the tester to select which of the branches the user should be progressed to when arriving at an experimental step. Thus, the way in which experimental steps are performed during the testing of a journey may determined by a setting that the tester selects at the beginning of the testing process.

Assuming the performance of experimental step seven 426 sends the user down the branch 427, the user would then arrive at Step eight 428. In step eight 428 a message that advertises goods or services for sale on the website is sent to the user, and the advertised goods or services are selected based on user demographic information which is obtained from one or more databases of user information.

The user then progresses on to step nine 435, which is a delay step. Step nine 435 also involves holding the user at step nine 435 for 24 hours before the user progresses to step ten 430.

In Step ten 430, the system determines whether the user has made a purchase on the website. Once again, the determination of whether the user made a purchase on the website could be based on actual user data from one or more user databases, or the tester can be queried to determine whether the user should be considered to have made a purchase on the website. If so, the user is progressed along branch 431 to arrive at Step eleven 432. In Step eleven 432, the system sends a message to the user with advertisements for items like the ones the user has already purchased. The user then exits the messaging journey.

If the performance of Step ten 430 determines that the user has not yest made a purchase, the user is progressed along branch 433 and the user exits the messaging journey.

If the performance of experimental Step seven 426 progresses the user along branch 429, the user arrives at Step twelve 434. In Step twelve 434, the system sends the user a message providing a discount for future purchases. The user then progresses to step thirteen 437, which is another delay step. In step thirteen 437 the user is held for 24 hours before progressing on to Step fourteen 440.

At step fourteen 440 the system determines whether the user has purchased three items within the last seven days from the website. If so, the user proceeds along branch 441 to arrive at Step fifteen 442. At Step fifteen 442, system sends a message to the user thanking the user for making purchases, and the user exits the messaging journey.

If the performance of Step fourteen 440 indicates that the user has not made three purchases within the last seven days, the user is progressed along branch 443 and the user exits the messaging journey.

The foregoing description of the messaging journey is but one example of how a messaging journey can be configured. There is great flexibility in how the steps are arranged, and how each individual step is configured. Portions of this messaging journey will be discussed below in connection with an explanation of how the messaging journey would be tested by a campaign testing unit 260.

Figure 5:
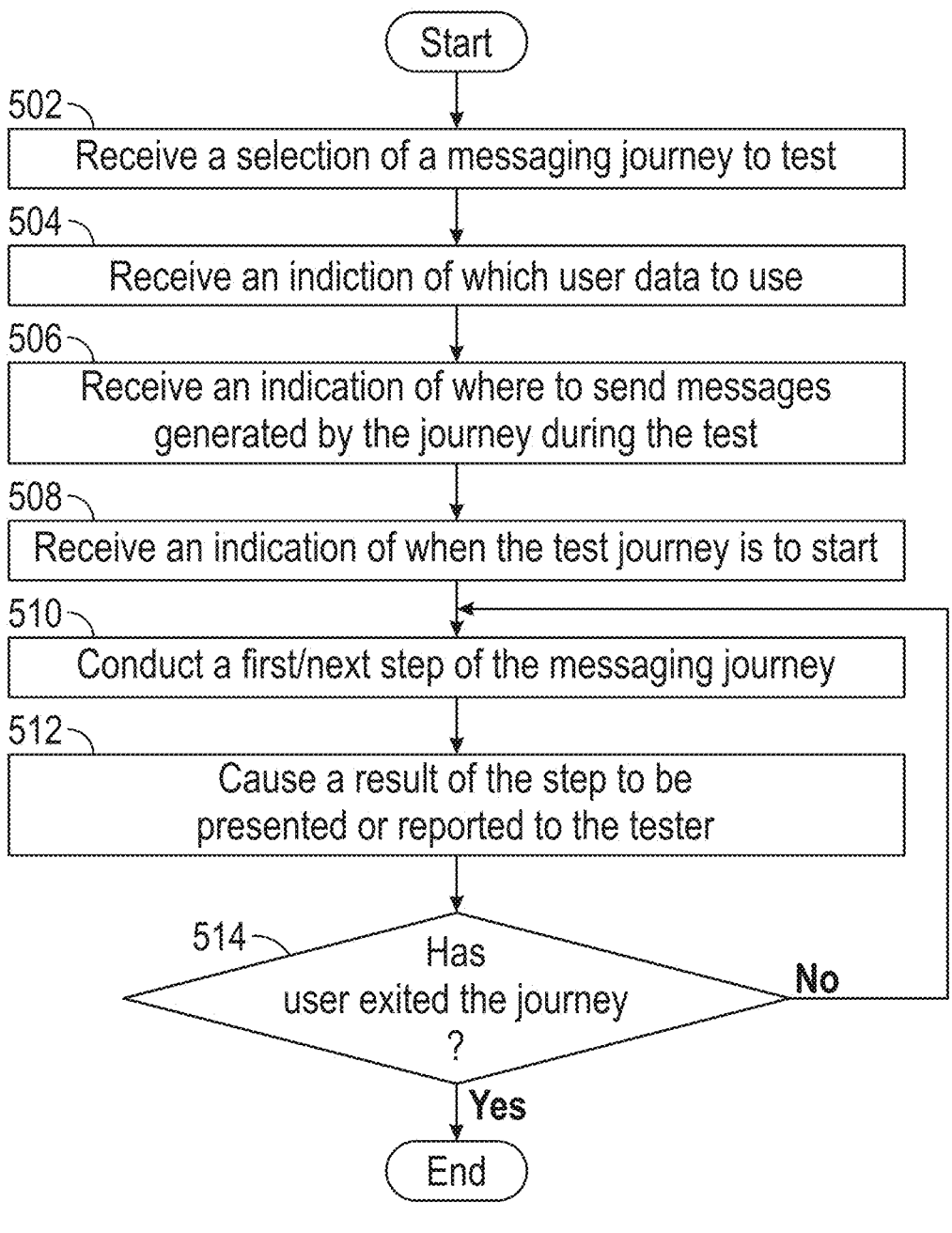
FIG. 5 is a flowchart illustrating steps of a method of testing a journey.
Figure 6:
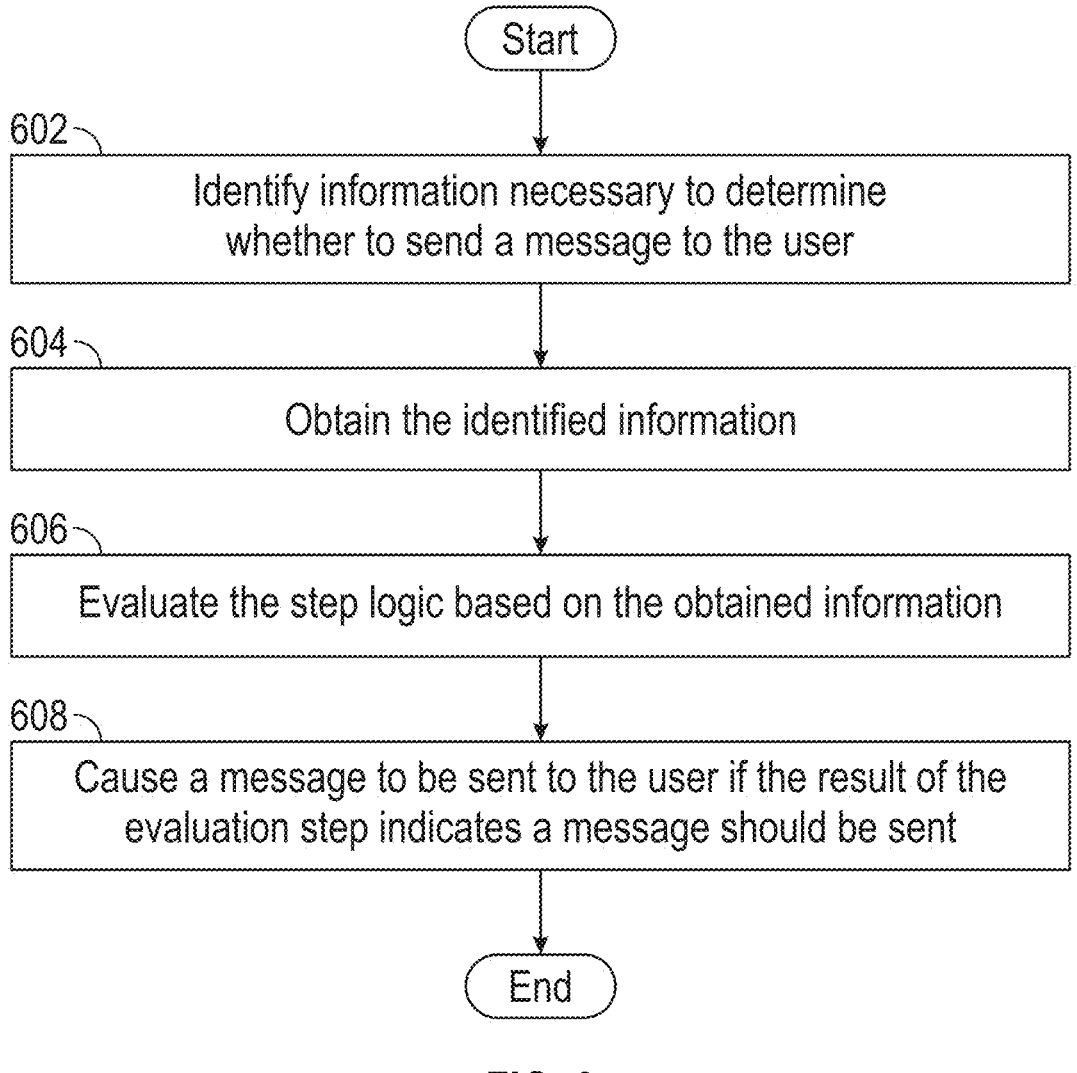
FIG. 6 is a flowchart illustrating steps of a method of conducting a step of a messaging journey in which a message may or may not be sent to a user.
Figure 7:
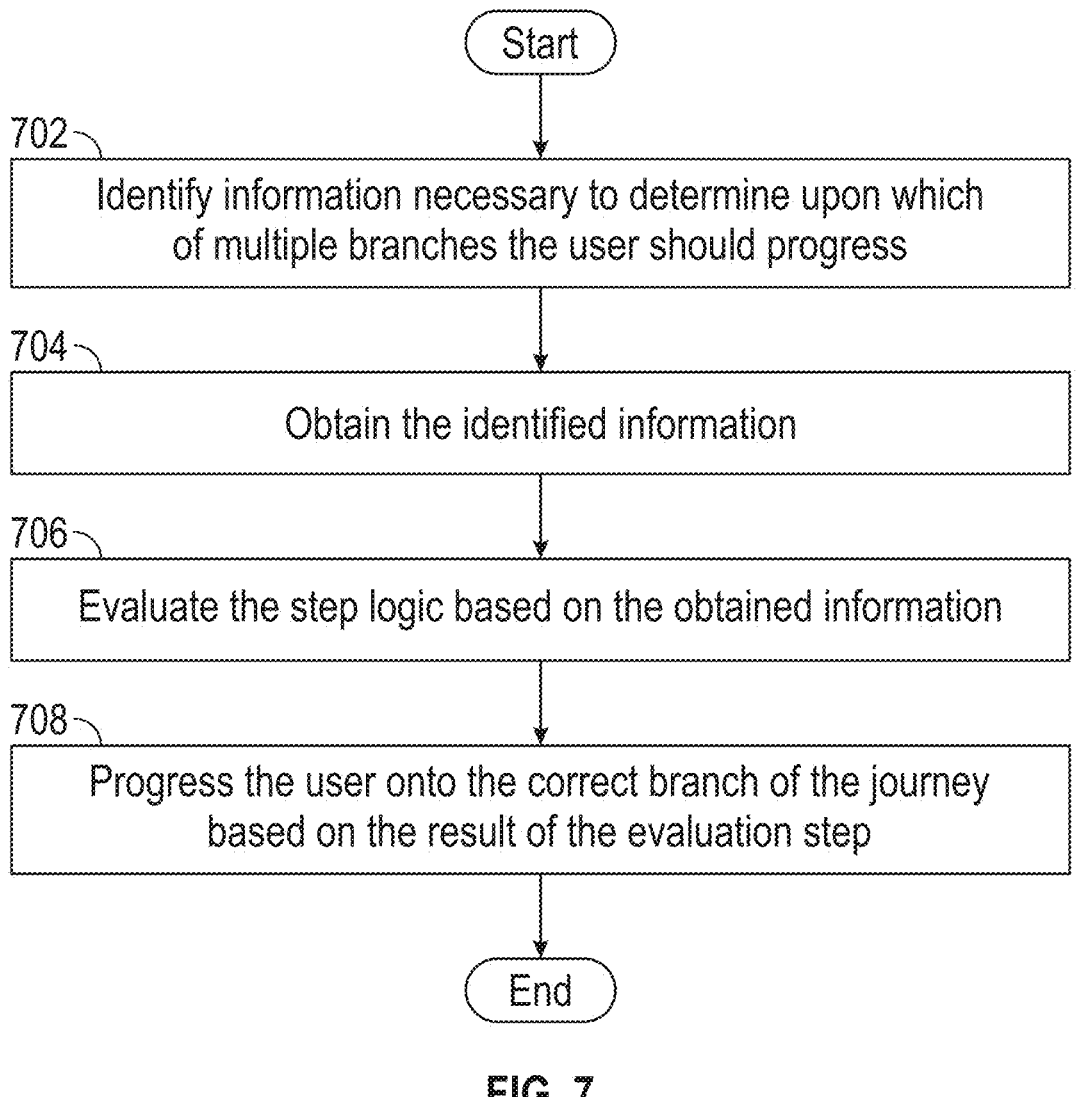
FIG. 7 is a flowchart illustrating steps of a method of conducting a step of a messaging journey in which information is used to determine which of multiple branches of a journey a user should proceed along.
Figure 8:
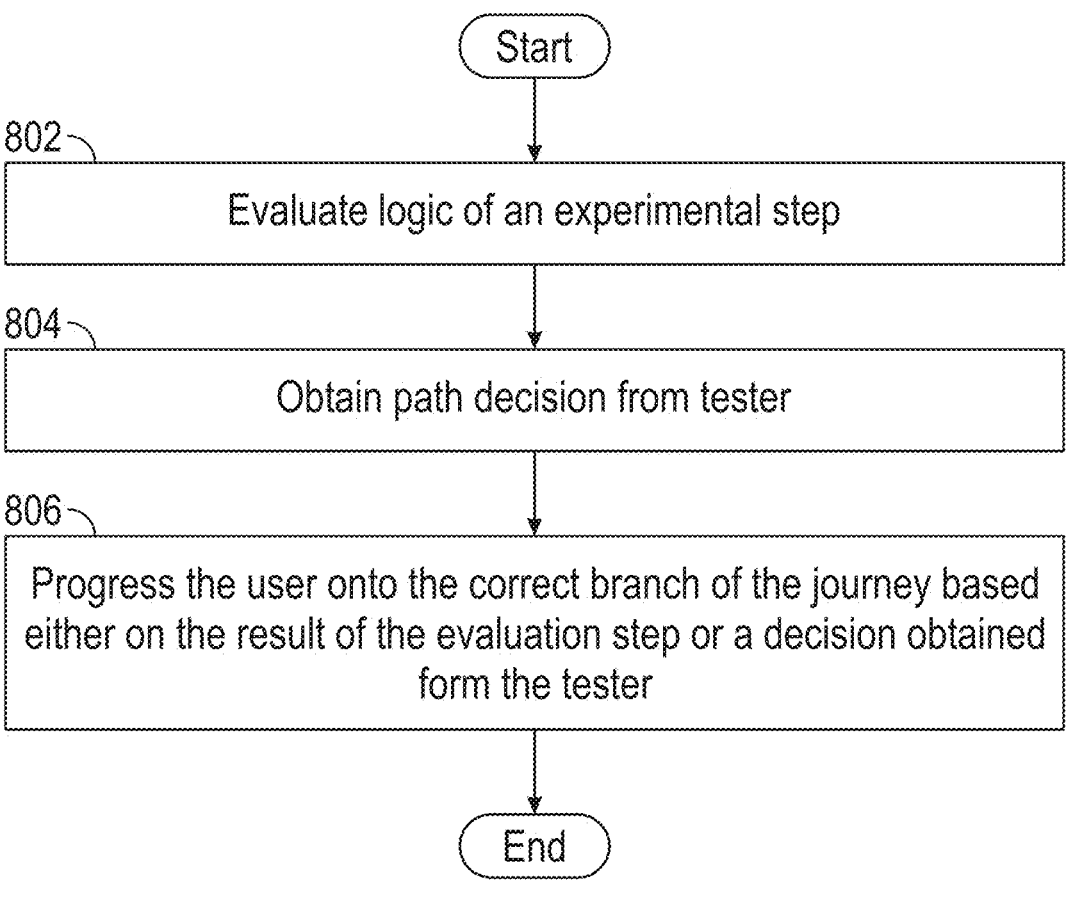
FIG. 8 is a flowchart illustrating steps of a method of conducting an experimental step of a messaging journey where a user may be randomly assigned to proceed along one of multiple different branches of a messaging journey.

FIG. 5 illustrates steps of a method of testing a messaging journey. FIGS. 6-8 illustrates ways in which one step of the method illustrated in FIG. 5 could be performed—basically representing how an individual step of a journey could be performed. FIGS. 9-14 illustrate a testing user interface which a tester could use to test a messaging journey. In particular, FIGS. 9-14 illustrate how the testing user interface 262 would look as a tester performs a test of one path of the messaging journey depicted in FIG. 4. These figures will be used together to discuss a typical messaging journey testing process.

Figure 9:
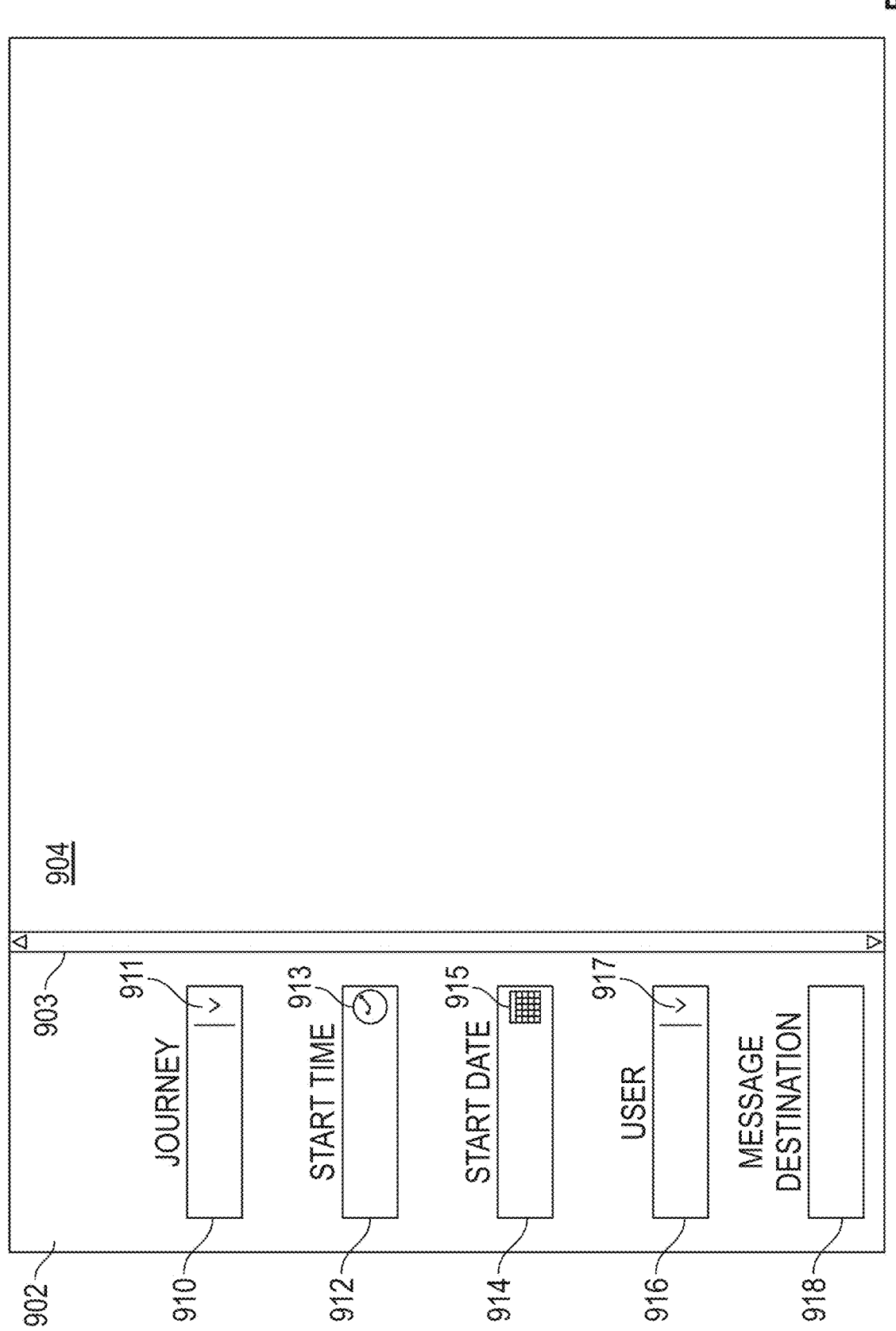
FIG. 9 is a diagram illustrating an example user interface of a messaging journey testing system where a tester is being asked for information needed to conduct a test of a messaging journey.

FIG. 9 illustrates a testing user interface which would be presented to a tester on a screen of a computing device. This testing user interface would be generated by the testing user interface unit 262 of the campaign testing unit 260 depicted in FIG. 3.

As shown in FIG. 9, the screen is split into two portions, 902 and 904. A information and input section 902 provides a location which can be used to display information to the tester, and to receive input from the tester. A graphical display section 904 is used to display a graphical representation of steps of the messaging journey as the testing procedure progresses.

The display presented to the user includes a scrolling bar 903 that can be used to scroll through information that is being presented in the information and input section 902. As a user progresses through the steps of a journey while testing a path through the journey, information is added to what is being displayed to the tester in the information and input section 902. One can use the scrolling bar 903 to move upward and downward in the information presented, which allows the tester to review the results of previously conducted tests, and the information that the tester has input in response to queries.

The testing process would start with the testing user interface depicted in FIG. 9. As shown therein, the information and input section 902 currently shows five different areas which are designed to receive input from the tester. Input area 910 is used to input information about the journey which is to be tested. Input area 910 can include a selection icon 911 which is used to open a dropdown menu of different available messaging journeys which could be tested. The tester would then select one of those journeys presented on the dropdown menu.

The input and information section 902 also includes a start time input area 912. The tester either inputs a start time or selects a time menu by selecting the time icon 913. If the time icon is selected, the user uses a displayed menu to select a start time for the testing process.

The information and input section 902 also includes an input area 914 for identifying the start date for testing the messaging journey. The user can input a date, or select a calendar icon 915 to be taken to a calendar menu which can be used to select a particular date for the beginning of the test.

The information and input section 902 further includes a user input section 916 which is to be used to identify an individual actual user that will traverse the journey during the test. Actual user information for the identified user would then be used to perform steps of the journey during the test. The tester can either input the name of an actual user, or select a dropdown menu icon 917 to be presented with a menu of available users.

Finally, the input and information section 902 also includes an area 918 for providing an address or telephone number to which messages generated by the messaging journey will be sent. This allows the tester to identify a temporary email address or a temporary telephone number to which messages generated during testing of a messaging journey are sent. This prevents the messages generated during the test from being sent to the actual user selected at section 916.

Returning now to FIG. 5, the test process would begin in Step 502 where the testing user interface 262 of a campaign testing unit 260 receives a selection of a messaging journey to be tested. This would be done using the input area 910 shown in FIG. 9.

The method then proceeds to Step 504 where the testing user interface 262 receives an indication of which user to use for purposes of conducting a test of the messaging journey. This indication of the user would be received via input area 916 as shown in FIG. 9.

The method then proceeds to Step 506 where the testing user interface 262 receives an indication of where messages generated during performance of the test are to be sent. This information would be received via the input area 918 shown in FIG. 9.

In Step 508, the testing user interface 262 receives an indication of when the test journey is to start. This would include inputting both a start time and a start date using the input areas 912 and 914, as shown in FIG. 9.

Figure 10:
FIG. 10 is a diagram of the user interface after a tester has input information about how to conduct a test of a messaging journey.

FIG. 10 illustrates the user interface after a tester has conducted steps 502-508 of the testing method depicted in FIG. 5. As depicted in FIG. 10, the tester has selected the Welcome Journey for testing, which is the journey depicted in FIG. 4 and discussed above. The tester has identified the start time for the test of the Welcome Journey as being Oct. 1, 2025 at 1 AM. The tester has indicated that the testing of the Welcome Journey should be conducted using John Smith's information. Also, the tester has input the email address tman@gmail.com as the destination to which messages generated during the test should be sent.

With the initial testing conditions set, the method would then proceed to Step 510 in which the journey testing execution system 264 of the journey testing unit 260 performs the first step, Step one 401 of the Welcome Journey. This portion of the test results in the user being presented with the information and graphic depicted in FIG. 11.

As explained above, performing Step one 401 involves sending a welcome message to a user. The user then progresses to step two 402, where the user is delayed for 24 hours before progressing on to step three 404. As a result, the journey testing executing system 264 would cause a welcome message to be sent to the email address tman@gmail.com. But rather than actually waiting for 24 hours to elapse to account for the delay in step two 402, after the welcome message is sent, the journey testing execution system immediately progresses the user on to Step three 404. Also, the journey testing execution system would cause information about how Step one 401 and step two 402 were performed to be displayed in the information and input section 902 of the user interface depicted in FIG. 11.

Figure 11:
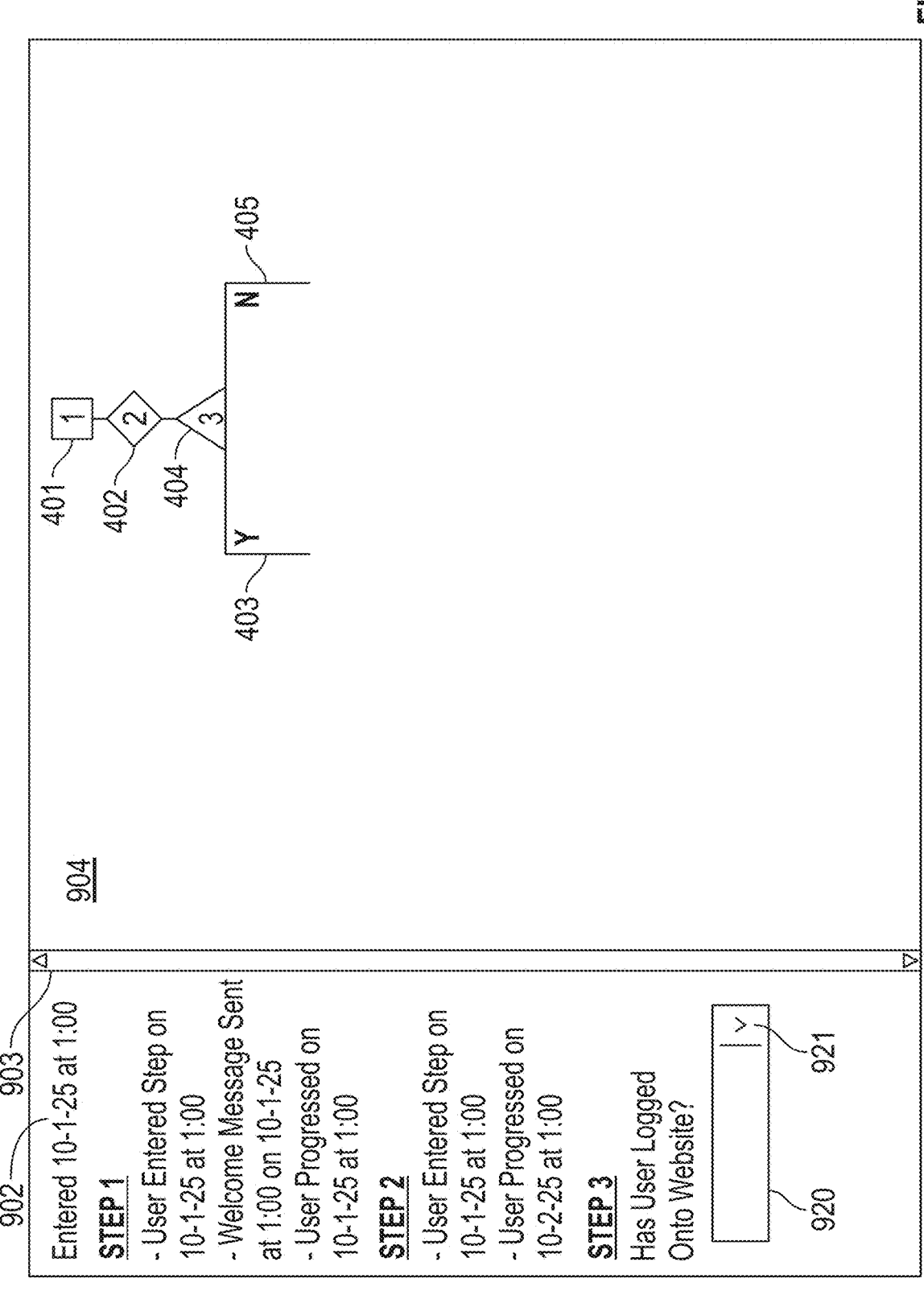
FIG. 11 is a diagram of the user interface after the test of a messaging journey has begun, showing how information about how a first and second step were conducted is reported to the tester and showing how the interface queries a tester for information needed to proceed with the test.

As shown in FIG. 11, the user interface indicates that when Step one 401 was conducted, the user entered the step at the start time of Oct. 1, 2025 at 1 AM. The welcome message was sent to the user immediately at 1 AM on Oct. 1, 2025. The journey testing execution system 264 then immediately progressed the user onto Step two 402 at lam of Oct. 1, 2025.

The user interface also indicated that then step two 402 was conducted, the user entered the step at 1 am on Oct. 1, 2025, and that the user progressed on to the next step at 1 am on Oct. 2, 2025, after the theoretical 24 hour delay elapsed.

Note, the tester could then check to ensure that the appropriate welcoming message was sent to the tman@gmail.com email address and that the welcoming message was properly addressed to John Smith, the user that was selected for conducting the testing process.

The journey testing execution system 264 would then perform Step three 404 of the journey, which involves determining whether the user has logged onto the website. Because this is simply a test of the messaging journey, John Smith will not have actually received a welcoming message or been invited to log on to the website. As a result, we will assume that the journey testing unit 260 has been configured to seek input from the tester when it is necessary to determine whether the user has taken a particular action as part of performing a step of the journey. Thus, performing Step three 404 would include asking the tester if the tester would like to proceed through Step three 404 as if John Smith had logged on to the website, or as if John Smith had not yet logged on to the website.

As shown in FIG. 11, the information and input section 902 of the user interface presented the tester with an input block 920 where the tester can input a yes or no answer. Alternatively, the tester could select a dropdown menu using the dropdown menu icon 921 to be presented with a list of options for satisfying Step three 404. Either way, the tester would provide input indicating whether the test should proceed as if John Smith had logged on to the website, or as if John Smith had not yet logged on to the website. No further actions will occur until the tester has provided that input.

For purposes of this description, we will assume that the tester input a yes in input section 920 of the user interface to indicate that the test should proceed as if John Smith had logged on to the website. As a result, the journey testing execution system would progress the user along branch 403 to Step sixteen 406.

Returning to the method depicted in FIG. 5, during a first iteration of Step 510, the journey testing execution system 264 would have performed Step one 401 of the journey. This involves sending the user a welcoming message and then progressing on to step two 402. The method would then proceed to Step 512 which involves causing a result of the performance of the step to be presented or reported to the tester.

The performance of step 512 would correspond to presenting the tester with the information about how Step one 401 was performed, as depicted in FIG. 11. The method would then proceed to Step 514 where a check is performed to determine whether the user has exited the journey. In this case, the answer would be No. As a result, the method would loop back to Step 510 and step two 402 would be performed. During the second iteration of 510 really means immediately exiting the step and progressing on to the next step, no action is taken. Thus, the method would proceed to step 512, during which the tester is presented with information about how step two 402 was performed, as explained above. The method then proceeds to step 514 where a check is performed to determine if the user has exited the journey. Because the answer is no, the method then loops back to step 510 during which the next step of the messaging journey would be performed.

Performing the next step of this journey would mean performing Step three 404, the branching step. During this third iteration of Step 510, the journey testing execution system 264 would cause the input area 920 in the information and input area 902 of the user interface to be displayed, and the journey testing and execution system 264 would wait for the tester to input a Yes or a No answer to indicate whether the tester wishes to proceed as if the user had logged on to the website, or as if the user had not logged on to the website. When the user enters Yes or No into the input block 920, the journey testing execution system 264 would then progress user down branch 403.

Figure 12:
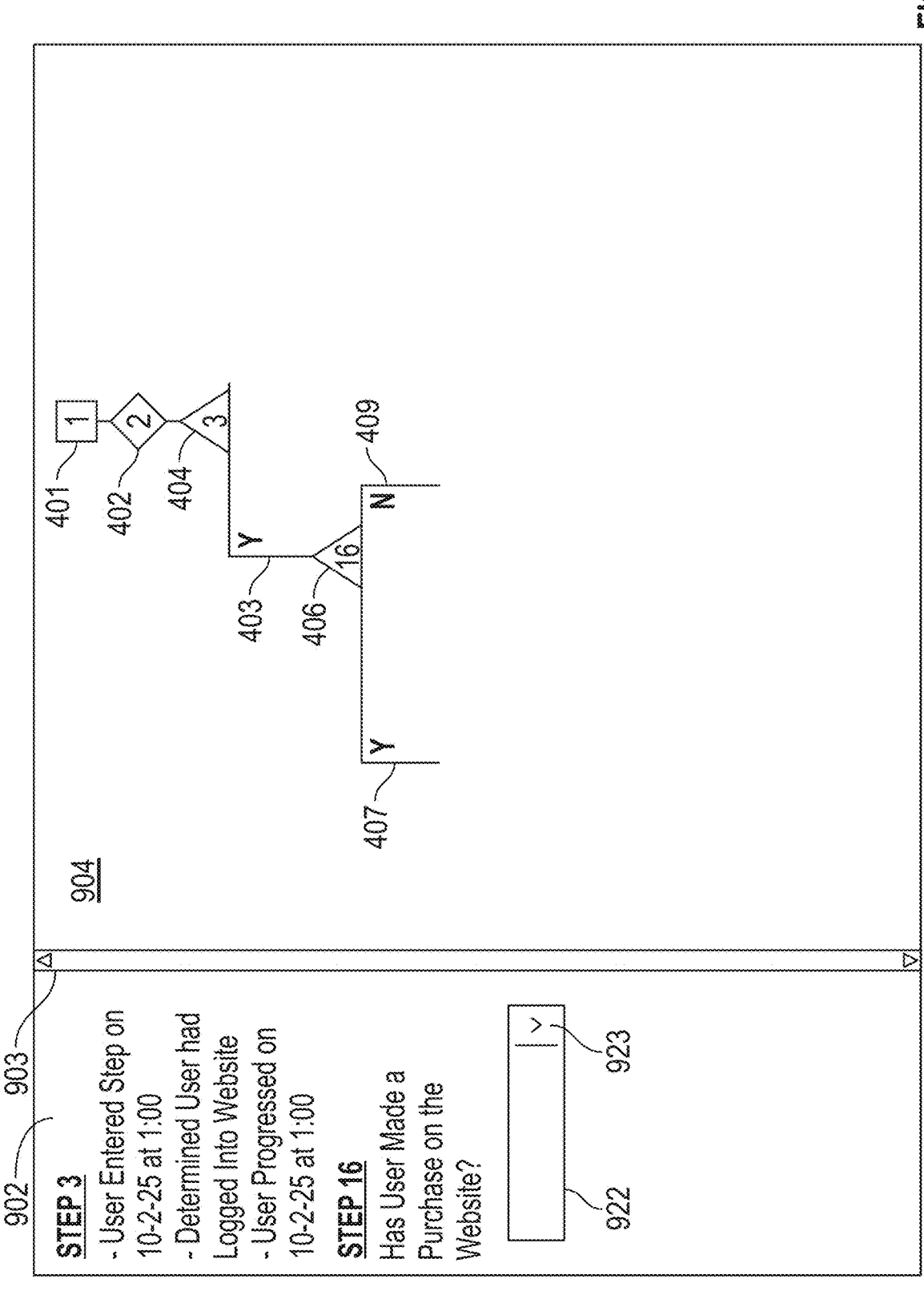
FIG. 12 is a diagram of the user interface showing how information about how a third step was conducted is reported to the tester and showing how the interface queries a tester for information needed to proceed with the test.

In the method depicted in FIG. 5, once the performance of step three 404 is completed, the method would proceed to Step 512 which involves causing the result of the performance of Step three 404 to be presented or reported to the tester. In this case, that would mean causing the information and input area 902 of the testing user interface to be updated with information as to the result of the performance of step three 404, as shown in FIG. 12. This also means displaying more of the structure of the messaging journey in the graphical display area 904, as also shown in FIG. 12, to indicate that the user has progressed along branch 403 to arrive at Step sixteen 406.

As shown in FIG. 12, the information about how Step three 404 was performed includes indications that: (1) the user entered Step three 404 on Oct. 2, 2025 at 1 AM; (2) that the system determined that the user logged on to the website; and (3) that the user progressed on to the next step at 1 AM on Oct. 2, 2025.

Returning now to FIG. 5, the method would then proceed on to Step 514 for another determination as to whether the user has exited the journey. Again, the answer would be No. As a result, the method proceed back to Step 510 so that the journey testing execution system 264 can perform the next step of the messaging journey. In this case that would be Step sixteen 406.

The method depicted in FIG. 5 would continue looping through steps 510, 512 and 514 until a determination is made in Step 514 that the user has exited the messaging journey. At this point, the method depicted in FIG. 5 would end.

For purposes of this discussion, we will now continue on with an explanation of how the procedure of testing the messaging journey would proceed with references to FIGS. 12-15.

As mentioned above, at this point the user will have progressed to Step sixteen 406. Performing Step sixteen 406 involves determining whether the user has made a purchase on the website. For that reason, as shown in FIG. 12, the tester will be presented with an information input area 922 where the tester is to indicate whether the user has made a purchase on the website. We will assume that for purposes of this example, that the tester indicates that the user has not yet made a purchase from the website. As a result, the journey testing execution system 264 will progress the user along branch 409 to Step twenty two 416 of the messaging journey.

Figure 13:
FIG. 13 is a diagram of the user interface showing how information about how sixteenth, twenty second and twenty third steps of a journey were conducted is reported to the tester and showing how the interface queries a tester for information needed to proceed with the test.

As depicted in FIG. 13, the testing user interface will be updated to provide an indication of how Step sixteen 406 was performed. The information and input section 902 of the user interface indicates that: (1) the user entered the step at 1:01 AM on Oct. 2, 2025; (2) that there was a determination that the user had not made a purchase on the website; and (3) that the user was progressed to the next step at 1:01 AM on Oct. 2, 2025. Also, the journey testing execution system 264 updates the graphical depiction area 904 of the testing user interface to include the next few steps of the testing journey that will be performed.

The journey testing execution system 264 would then execute Step twenty two 416, which involves sending the user a message which includes discounts for future items purchased via the website. The user then progresses onto step twenty three 436, which involves waiting for a 24 hour delay period to expire. When the messaging journey is actually performed for user, the user would then be held at Step twenty three 436 for 24 hours before being progressed on to Step twenty four 418. However, because this is a test of the messaging journey, the results of the performance of step twenty three 416 would be presented to the tester in the information an input section 902 of the testing user interface and the journey testing execution system 264 would immediately proceed to Step twenty four 418.

As shown in FIG. 13, the information and input area 902 of the testing user interface indicates that: (1) the user entered step twenty two 416 at 1:01 AM on Oct. 2, 2025; (2) that a discount message was sent to the user at 1:01 AM on Oct. 2, 2025; and (3) that user then progressed on to the next step at 1:01 AM on Oct. 2, 2025. FIG. 13 also shows in the information and input area that the user entered step twenty three 436 at 1:01 on Oct. 2, 2025, and that the user then progressed onto the next step at 1:01 on Oct. 3, 2025.

Figure 14:
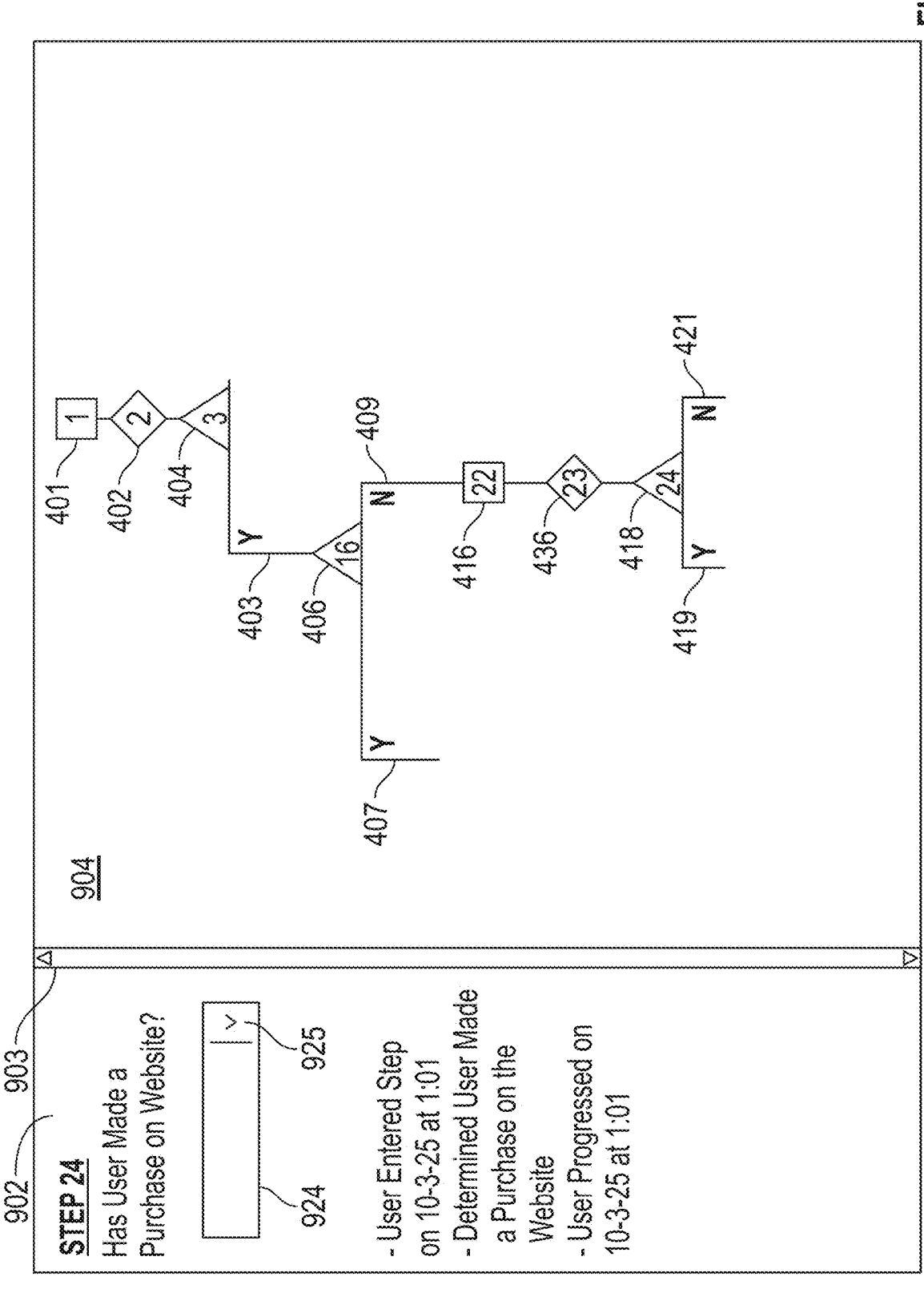
FIG. 14 is a diagram of the user interface showing how information about how a twenty fourth step of the journey was conducted is reported to the tester.

The journey testing execution system 264 would then perform Step twenty four 418. In Step twenty four 418, the journey testing execution system 264 is to determine whether the user has made a purchase on the website. Here again, this requires input from the tester since this is merely a test. As a result, as shown in FIG. 14 the information and input section 902 of the testing user interface provides input area 924 to allow the tester to indicate whether or not the journey should proceed as if the user had made a purchase on the website, or as if the user had not made a purchase on the website. When the tester provides an answer, the journey testing execution system 264 would progress the user down either branch 419 or 421.

For purposes of this example we will assume that the tester indicated that the user has made a purchase from the website. As a result, executing Step twenty four 418 would involve progressing the user down branch 419. The journey testing execution system 264 would update the information presented in the information and input area 902 of the testing user interface to provide details on how Step twenty four 418 was performed. As shown in FIG. 14, the information and input section 902 indicates that the user entered the step on Oct. 3, 2025 at 1:01. The information about how Step twenty four 418 was performed also indicates that the system determined that the user made a purchase on the website, and that the user progressed on to the next step on 1:01 Oct. 3, 2025.

Figure 15:
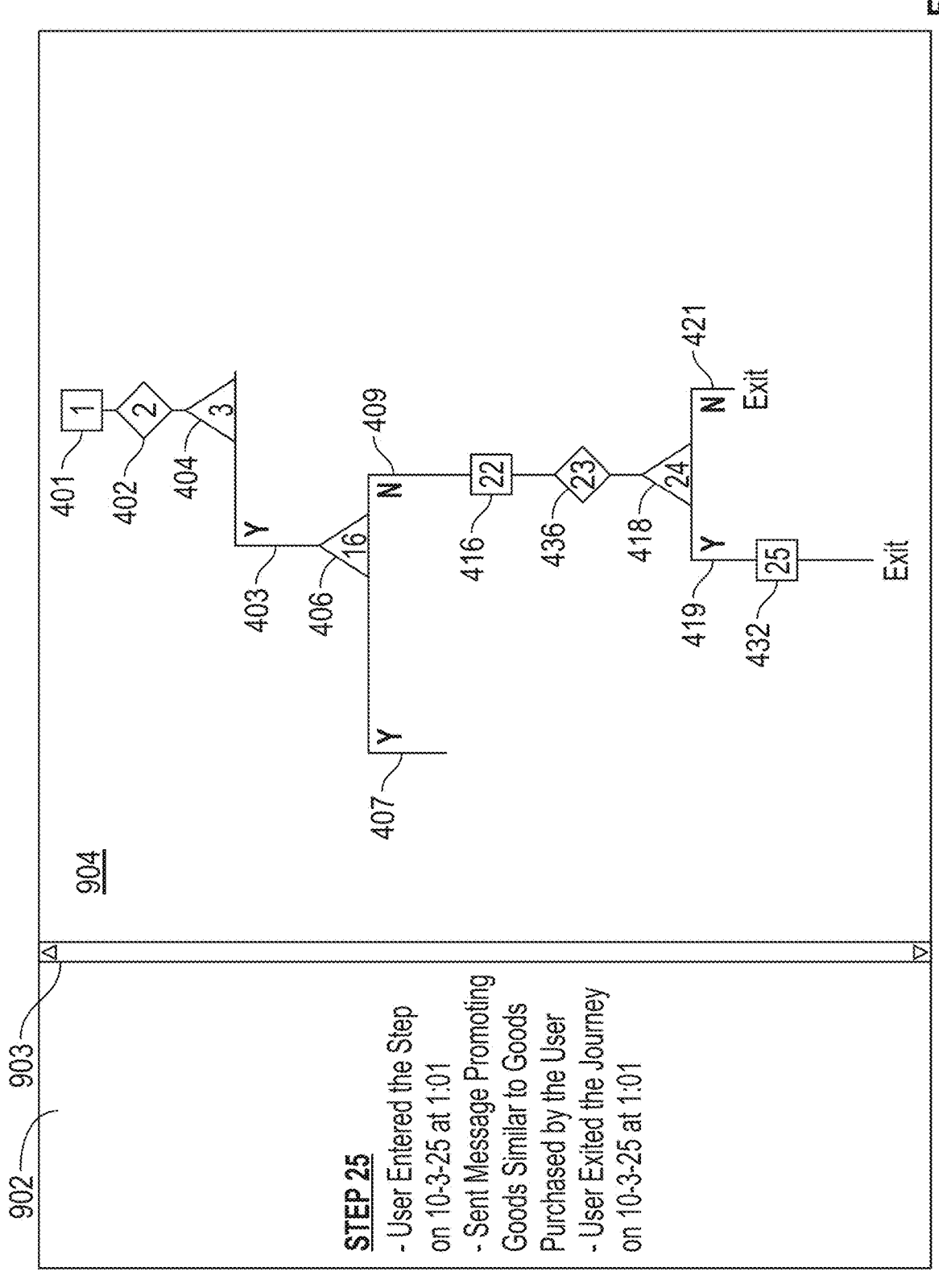
FIG. 15 is a diagram of the user interface showing how information about a twenty fifth step was conducted, and showing that the user has exited the journey.

Because no input was required from the tester to perform Step twenty five, the journey testing execution system 264 will have immediately performed Step twenty five 432. Performing step twenty five 432 involves causing a message to be sent to the user promoting goods similar to the goods previously purchased by the user, and then exiting the journey. Thus, the journey testing execution system 264 would cause an appropriate message to be sent to the user. The journey testing execution system 264 also causes information about how Step twenty five 432 was performed to be displayed to the tester in the information and input area 902 of the testing user interface. As shown in FIG. 15, the information and input area 902 indicates that: (1) the user entering the step at 1:01 on Oct. 3, 2025; that a message advertising goods for sale on the website was sent to the user; and (3) that the user then exited the journey at 1:01 on Oct. 3, 2025. These additional portions of the messaging journey are also depicted in the graphical section 904 of the testing user interface in FIG. 15.

The foregoing description and the depictions provided in FIGS. 9-15 are but one example of how a user interface can help a tester to progress through the steps of a messaging journey during a testing process. In alternate embodiments, the user interface could be configured differently and the steps of the method could be displayed in a different fashion. Moreover, the way in which input is sought from the tester could vary from what is shown in FIGS. 9-15.

For example, in the foregoing embodiment, portions of the overall structure of the messaging journey were added to the graphical display area 904 of the testing user interface as the testing process proceeded and the steps were performed by the journey testing execution system, 264. In an alternate embodiment, the entire structure of the messaging journey could be displayed in the graphical display area 904 of the testing user interface throughout the entire testing process. As individual steps are performed, portions of the overall structure of the messaging journey could be highlighted in some fashion to indicate the path that the user is taking through the messaging journey during a particular iteration of the test. This could make it easier for the tester to decide how to answer questions asking for input, making it easier for the tester to navigate the user through the portions of the messaging journey the tester wishes to test.

As also mentioned above, the journey testing execution system 264 could be configured to use actual user data to answer questions about whether a user has taken or not taken certain actions when performing the steps of the messaging journey during the testing process. In alternate embodiments, the journey testing execution system 264 could be configured to query the tester to make decisions and provide input about whether a user has taken or not taken certain actions when performing the steps of the messaging journey during the testing process. The way in which the journey testing execution system is configured could be altered by the tester prior to testing a messaging journey, or even during performance of a test of a messaging journey.

As mentioned above, the messages that are sent by the system as part of the testing process would be delivered to an email address or telephone number identified by the tester at the beginning of the test. This allows the tester to check to ensure that the messages that were generated and sent are accurately formatted and include the appropriate information.

Because it is possible to send messages to a user via multiple different messaging channels, the journey testing content and messaging unit 268, which is responsible for causing messages to be sent during the journey testing process, may create various different versions of messages, but send them all to a single email address or telephone number provided by the tester at the beginning of the testing process. For example, if one step of a journey calls for an email message to be sent, the journey testing content and messaging unit 268 could cause an email message to be sent to the email address provided by the tester. However, if a different step of the journey calls for a text message to be sent to the user, the journey testing content and messaging unit 268 could format a message like it would appear when sent as a test message, but still send the message as an email message that is sent to the same email address provided by the tester. Similarly, if a step of a method calls for causing an in-application message to be presented to the user, the journey testing content and messaging unit 268 could cause a differently formatted message to also be sent as an email message to the email address provided by the tester. In this way, all messages are sent to the same email address provided by the tester, but the different format of the messages will provide an indication of whether the message was properly formatted according to the configuration of the individual steps of the journey.

In other embodiments, the tester could be required to provide different forms of address information for each of the different types of messages that could be sent via the steps of a journey at the beginning of the test. For example, if the steps of a messaging journey that is to be tested could send both email messages and text messages, at the beginning of the testing procedure the journey testing execution system 264 could ask the tester to provide both an email address to which email messages will be sent and a text messaging address (such as a telephone number) to which text messages will be sent.

Obviously, what is described above and depicted in FIGS. 9-14 is but one way of traversing all the different potential paths of the messaging journey depicted in FIG. 4. A tester could re-perform a test of the same messaging journey and give different answers to the input questions in order to traverse different sections of the messaging journey. In this way, a testing person could ultimately progress through all the different various paths and branches of a messaging journey to ensure that all portions of the messaging journey are operating properly.

Also, it is inherent in what was previously described that each of the steps of the messaging journey would be performed as soon as all of the information necessary to perform the step is provided. Although various steps of a messaging journey might involve waiting for a delay period to expire before progressing on to the next step, no delay is imposed during the testing procedure. Thus, the testing person can very quickly progress through all steps of a messaging journey without any delays to very rapidly test the messaging journey to ensure that it is operating properly.

FIGS. 6-8 illustrate various methods which would correspond to performance of Step 510 of the method depicted in FIG. 5, which involves performing a step of a messaging journey during a test of the messaging journey. Thus, each of FIGS. 6-8 depict different ways of performing a step of a messaging journey. The different methods correspond to different types of journey steps. FIGS. 6-8 depict but three examples of how steps of a journey could be performed. There are other types of journey steps that would require performance in other ways not depicted in FIGS. 6-8.

FIG. 6 is a flowchart of how a step of a messaging journey is performed when the step involves sending a message to a user. The method would begin and proceed to Step 602 where the journey testing execution system 264 would examine the configuration or logic of the step to determine what information is necessary to decide whether a message should be sent to the user. The configuration of the step may also indicate the information that should be included in any message what is sent to the user. In Step 602, the journey testing execution system 264 identifies all of the information that is necessary to decide whether to send the message and what information may be needed to create the message should the message be sent. The method then proceeds to Step 604 where the journey testing execution system 264 obtains the information identified in Step 602. In Step 606 the journey testing execution system 264 then evaluates the logic or configuration of the step based on the obtained information.

If the evaluation in Step 606 indicates that a message should be sent to the user, in step 608 the message is configured and caused to be sent. The journey testing content and messaging unit 268 of the journey testing unit 260 may be responsible for performing step 608. As previously mentioned, when a message is sent to the user, the journey testing content and messaging unit 268 is not itself responsible for delivering the message. Instead, the journey testing content and messaging unit 268 would instruct other elements, such as the message sending unit 220 of a customer engagement service 50, to cause the message to be sent. However, the journey testing content and messaging unit 268 may be responsible for generating the content of the message. The method then ends.

FIG. 7 shows a flowchart of how a branching step of a messaging journey would be performed. The method begins and proceeds to Step 702 where the journey testing execution system determines what information is needed in order to decide which branch the user should progress along. In Step 704, the journey testing execution system 264 obtains the information identified in Step 702. In Step 706 the journey testing execution system 264 uses the logic or configuration of the Step to evaluate the obtained information and to thereby determine which branch the user should progress along. In Step 708, the user is then progressed along the correct branch of the journey based on the result of evaluation step 706. The method then ends.

FIG. 8 shows a flow chart of how an experimental step of a messaging journey is performed. As explained above, an experimental step is configured so that a first percentage of users are progressed along one branch and another percentage of users are progressed along another branch. In the case of two branches, this could be a fifty percent/fifty percent split. However, the split need not be fifty/fifty. Instead, the step could be configured to send any first percentage of all users down a first branch and a second different percentage of users down a second branch. Also, an experimental step could have more than two branches, with a predetermined percentage of all users being sent down each of the branches. the logic of the experimental step will determine how many branches exist and the percentages of users that are to be progressed along each of the different branches.

In Step 802, the journey testing execution system 264 evaluates the logic of the experimental step. Because this is an experimental step which is being tested, as opposed to one which is in actual operation, it may be necessary to then obtain input from the tester as to which of the branches the user is to be progressed along. Thus, in Step 804 the journey testing execution system asks the tester to input an indication of which branch the user is to be progressed along. The method then proceeds to Step 806 where the user is progressed along the correct branch of the journey based on the input obtained in Step 804. The method then ends.

In alternate embodiments, the tester may not be asked for input in how to perform an experimental step. Instead, performance of the experimental step may involve a random selection made by the journey testing execution system, and that random selection may be based on the logic of the experimental step. For example, if an experimental step involves sending 50% of users down a first branch of the journey and sending the other 50% of users down a second branch of the journey, a random selection could be made to resolve which branch the user is progressed along.

In the foregoing examples, a test of a messaging journey is run for a single user for a single path through the messaging journey. As explained above, the test of the messaging journey can be re-run multiple times for the same user, but varying the responses the tester provides to queries for input such that the user can progress down multiple different paths during each iteration of the test.

It is also possible to test the messaging journey against a group of users to see which users in the group received which messages. This approach would involve identifying the users who are to be included in the test group. During this sort of a group test, the experimental steps could be automated to ensure that the correct percentage of the group of users is sent down each branch extending from an experimental step. Also, to the extent it makes sense, if performance of a step calls for determining whether a user took or did not take a particular action, actual user data about what the users in the group have done can be used to test the messaging journey against the group of users. The journey testing execution system 264 might also be configured to predict how many of the users would or would not have taken the action based on past data about the users' actions.

That said, when testing a messaging journey against a group of users, it also may be necessary to make some decisions prior to performing the test as to how certain steps are to be decided. For example, if a step of a method calls for determining whether a user has made a purchase on a website, one of the predetermined conditions for performing the test could be the assumption that 45% of all users will be determined to have made a purchase on the website. Establishing certain predetermined conditions for the test may be necessary when testing a messaging journey against a group of users.

The result of testing a messaging journey against a group of users could include an indication of the number or percentage of users that received certain types of messages, an indication of the numbers or percentages of users that progressed down each distinct path through the messaging journey, as well as additional information.

The present invention may be embodied in methods, apparatus, electronic devices, and/or computer program products. Accordingly, the invention may be embodied in hardware and/or in software (including firmware, resident software, micro-code, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object-oriented programming language, such as JavaScript, Java®, Swift or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 16:
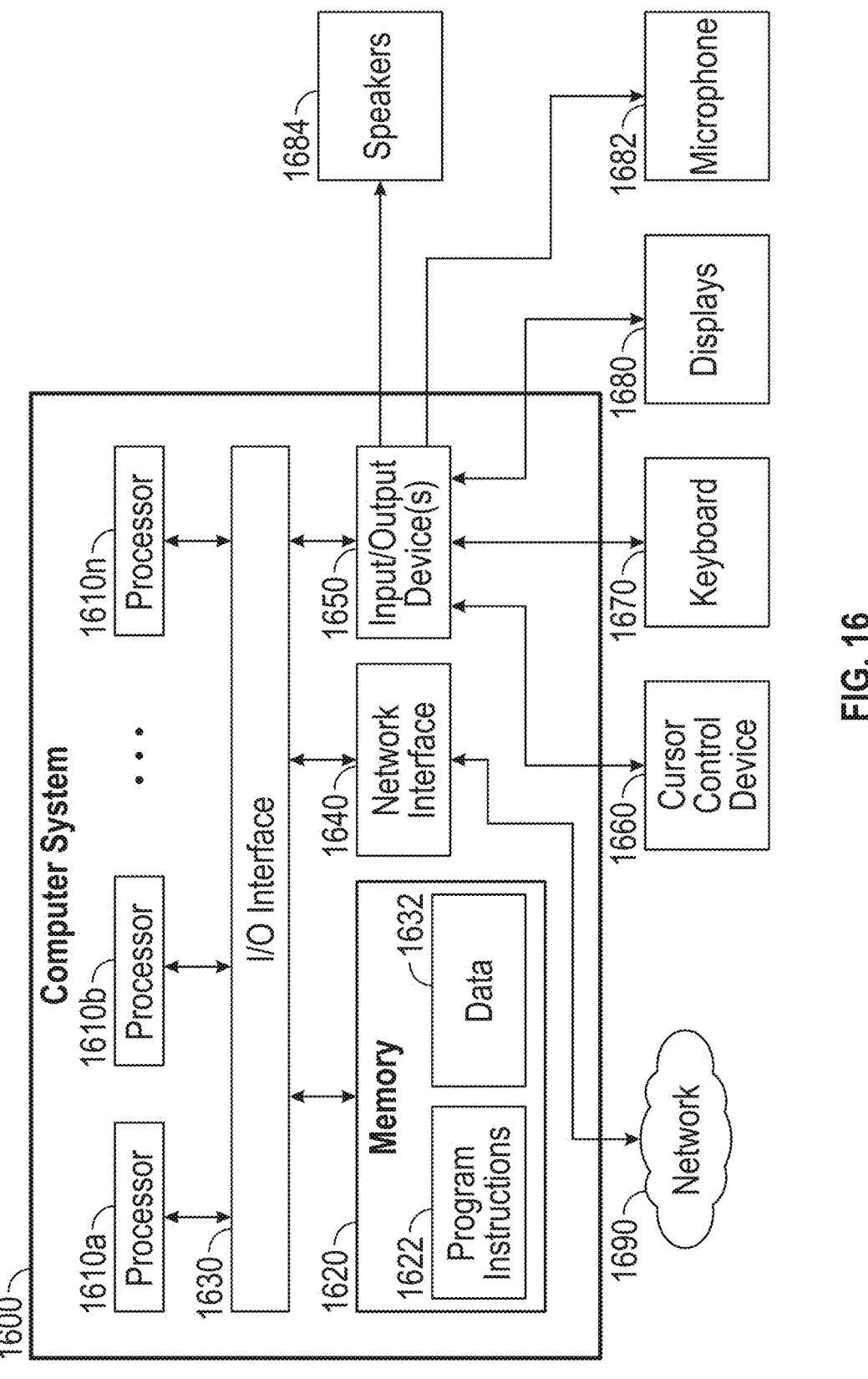
FIG. 16 is a diagram of a computer system and associated peripherals which could embody the invention, or which could be used to practice methods embodying the invention.

FIG. 16 depicts a computer system 1600 that can be utilized in various embodiments of the present invention to implement the invention according to one or more embodiments. The various embodiments as described herein may be executed on one or more computer systems, which may interact with various other devices. One such computer system is the computer system 1600 illustrated in FIG. 15. The computer system 1600 may be configured to implement the methods described above. The computer system 1600 may be used to implement any other system, device, element, functionality or method of the above-described embodiments. In the illustrated embodiments, the computer system 1600 may be configured to implement the disclosed methods as processor-executable executable program instructions 1622 (e.g., program instructions executable by processor(s) 1610) in various embodiments.

In the illustrated embodiment, computer system 1600 includes one or more processors 16101610*a*-16101610*n* coupled to a system memory 1620 via an input/output (I/O) interface 1630. Computer system 1600 further includes a network interface 1640 coupled to I/O interface 1630, and one or more input/output devices 1650, such as cursor control device 1660, keyboard 1670, display(s) 1680, microphone 1682 and speakers 1684. In various embodiments, any of the components may be utilized by the system to receive user input described above. In various embodiments, a user interface may be generated and displayed on display 1680. In some cases, it is contemplated that embodiments may be implemented using a single instance of computer system 1600, while in other embodiments multiple such systems, or multiple nodes making up computer system 1600, may be configured to host different portions or instances of various embodiments. For example, in one embodiment some elements may be implemented via one or more nodes of computer system 1600 that are distinct from those nodes implementing other elements. In another example, multiple nodes may implement computer system 1600 in a distributed manner.

In different embodiments, the computer system 1600 may be any of various types of devices, including, but not limited to, a personal computer system, desktop computer, laptop, notebook, or netbook computer, a portable computing device, a mainframe computer system, handheld computer, workstation, network computer, a smartphone, a camera, a set top box, a mobile device, a consumer device, video game console, handheld video game device, application server, storage device, a peripheral device such as a switch, modem, router, or in general any type of computing or electronic device.

In various embodiments, the computer system 1600 may be a uniprocessor system including one processor 1610, or a multiprocessor system including several processors 1610 (e.g., two, four, eight, or another suitable number). Processors 1610 may be any suitable processor capable of executing instructions. For example, in various embodiments processors 1610 may be general-purpose or embedded processors implementing any of a variety of instruction set architectures (ISAs). In multiprocessor systems, each of processors 1610 may commonly, but not necessarily, implement the same ISA.

System memory 1620 may be configured to store program instructions 1622 and/or data 1632 accessible by processor 1610. In various embodiments, system memory 1620 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 1620. In other embodiments, program instructions and/or data may be received, sent or stored upon different types of computer-accessible media or on similar media separate from system memory 1620 or computer system 1600.

In one embodiment, I/O interface 1630 may be configured to coordinate I/O traffic between processor 1610, system memory 1620, and any peripheral devices in the device, including network interface 1640 or other peripheral interfaces, such as input/output devices 1650. In some embodiments, I/O interface 1630 may perform any necessary protocol, timing or other data transformations to convert data signals from one component (e.g., system memory 1620) into a format suitable for use by another component (e.g., processor 1610). In some embodiments, I/O interface 1630 may include support for devices attached through various types of peripheral buses, such as a variant of the Peripheral Component Interconnect (PCI) bus standard or the Universal Serial Bus (USB) standard, for example. In some embodiments, the function of I/O interface 1630 may be split into two or more separate components, such as a north bridge and a south bridge, for example. Also, in some embodiments some or all of the functionality of I/O interface 1630, such as an interface to system memory 1620, may be incorporated directly into processor 1610.

Network interface 1640 may be configured to allow data to be exchanged between computer system 1600 and other devices attached to a network (e.g., network 1690), such as one or more external systems or between nodes of computer system 1600. In various embodiments, network 1690 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1640 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 1650 may, in some embodiments, include one or more display terminals, keyboards, keypads, touchpads, scanning devices, voice or optical recognition devices, or any other devices suitable for entering or accessing data by one or more computer systems 1600. Multiple input/output devices 1650 may be present in computer system 1600 or may be distributed on various nodes of computer system 1600. In some embodiments, similar input/output devices may be separate from computer system 1600 and may interact with one or more nodes of computer system 1600 through a wired or wireless connection, such as over network interface 1640.

In some embodiments, the illustrated computer system may implement any of the operations and methods described above, such as the methods illustrated by the flowcharts of FIGS. 5-8. In other embodiments, different elements and data may be included.

Those skilled in the art will appreciate that the computer system 1600 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 1600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1600 may be transmitted to computer system 1600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of testing a messaging journey to determine the results of a user traversing steps of the messaging journey, comprising:

receiving a selection of which messaging journey a tester would like to test;

receiving an indication of which user's data should be used to test the selected messaging journey;

receiving an indication of where messages that are generated by the messaging journey should be sent;

conducting a first step of the selected messaging journey using, if necessary, data relevant to the indicated user that has previously been stored in one or more databases;

causing a result of the first step to be reported or displayed to the tester, wherein the result includes at least one of a time at which the user entered the step and a time at which the user progressed to another step or exited the messaging journey;

conducting an additional step of the selected messaging journey using, if necessary, data relevant to the indicated user that has previously been stored in one or more databases or information generated during the conduct of a previous step of the selected messaging journey or input from the tester;

causing a result of the additional step to be reported or displayed to the tester, wherein the result includes at least one of a time at which the user entered the additional step and a time at which the user progressed to another step or exited the messaging journey; and repeating the steps of conducting an additional step and causing a result of the additional step to be reported or displayed to the tester until conducting one of the additional steps results in the user exiting the selected messaging journey;

wherein steps of the selected messaging journey that by their nature or configuration normally would require time to elapse before they are performed are instead performed immediately after a result of a previous step is caused to be reported to displayed to the tester, or as soon thereafter as the tester provides information necessary for the step to be performed.

2. The method of claim 1, further comprising receiving an indication of a time at which the selected messaging journey is to begin.

3. The method of claim 1, wherein causing results of the first and additional steps to be reported or displayed to the tester comprises causing the time at which the user entered the step and the time at which the user exited the step to be reported or presented to the tester.

4. The method of claim 1, wherein receiving an indication of where messages are to be sent comprises receiving an address or telephone number to which electronic messages are to be directed.

5. The method of claim 4, wherein when conducting a step calls for an electronic message to be sent to the user, conducting the step comprises causing an electronic message to be sent to the received address or telephone number.

6. The method of claim 5, wherein when conducting a step calls for an electronic message to be sent to the user, causing the result of the step to be reported or presented to the tester comprising causing an indication of what electronic message was sent to be reported or displayed to the tester.

7. The method of claim 5, wherein when conducting a step calls for an electronic message to either be sent or not be sent to the user, depending on whether a condition is satisfied, conducting the step comprises:

determining whether the condition is satisfied; and sending or not sending the electronic message depending on the result of the determining step.

8. The method of claim 7, wherein when conducting a step calls for an electronic message to either be sent or not be sent to the user, depending on whether a condition is satisfied, causing a result of the step to be reported or presented to the tester comprises causing an indication of whether the condition was satisfied and whether the electronic message was sent to be reported or presented to the tester.

9. The method of claim 1, wherein when the way in which a step is conducted depends on whether the user takes or does not take an action, the method further comprises:

causing action selections to be presented to the tester, the action selections comprising ways in which the user could take or not take the action; and receiving an indication of which of the action selections the tester has chosen, wherein conducting the step comprises conducting the step based on the received indication of which of the action selections the tester chose.

10. The method of claim 9, wherein when the way in which a step is conducted depends on whether the user takes or does not take an action, causing a result of the step to be reported or presented to the tester comprises causing an indication of which of the action selections the tester chose to be reported or presented to the tester.

11. The method of claim 1, wherein when the way in which a step is conducted depends on whether the user belongs to a predefined segment of users, conducting the step comprises using previously recorded data to determine whether the user belongs to the predefined segment of users.

12. The method of claim 11, wherein when the way in which a step is conducted depends on whether the user belongs to a predefined segment of users, causing a result of the step to be reported or presented to the tester comprises causing an indication of whether the user belongs to the predefined segment of users to be reported or presented to the tester.

13. The method of claim 1, wherein when the way in which a step is conducted calls for a selection to be made between two or more options, conducting the step comprises:

causing option selections to be presented to the tester, the option selections indicating the available options that determine how the step could be conducted; and receiving an indication of which of the option selections the tester has chosen, wherein conducting the step comprises conducting the step based on the received indication of which of the option selections the tester chose.

14. The method of claim 13, wherein when the way in which a step is conducted calls for a selection to be made between two or more options, causing a result of the step to be reported or presented to the tester comprises causing an indication of which of the option selections the tester chose to be reported or presented to the tester.

15. A non-transitory computer readable medium bearing instructions which, when executed by one or more processors, cause the processors to perform a method of testing a messaging journey to determine the results of a user traversing steps of the messaging journey, the method comprising:

receiving a selection of which messaging journey a tester would like to test;

receiving an indication of which user's data should be used to test the selected messaging journey;

receiving an indication of where messages that are generated by the messaging journey should be sent;

conducting a first step of the selected messaging journey using, if necessary, data relevant to the indicated user that has previously been stored in one or more databases;

causing a result of the first step to be reported or displayed to the tester, wherein the result includes at least one of a time at which the user entered the step and a time at which the user progressed to another step or exited the messaging journey;

conducting an additional step of the selected messaging journey using, if necessary, data relevant to the indicated user that has previously been stored in one or more databases or information generated during the conduct of a previous step of the selected messaging journey or input from the tester;

causing a result of the additional step to be reported or displayed to the tester, wherein the result includes at least one of a time at which the user entered the additional step and a time at which the user progressed to another step or exited the messaging journey; and repeating the steps of conducting an additional step and causing a result of the additional step to be reported or displayed to the tester until conducting one of the additional steps results in the user exiting the selected messaging journey;

wherein steps of the selected messaging journey that by their nature or configuration normally would require time to elapse before they are performed are instead performed immediately after a result of a previous step is caused to be reported to displayed to the tester, or as soon thereafter as the tester provides information necessary for the step to be performed.

16. The non-transitory computer readable medium of claim 15, wherein the method performed by the one or more processors further comprises receiving an indication of a time at which the selected messaging journey is to begin.

17. The non-transitory computer readable medium of claim 15, wherein causing results of the first and additional steps to be reported or displayed to the tester comprises causing the time at which the user entered the step and the time at which the user exited the step to be reported or presented to the tester.

18. The non-transitory computer readable medium of claim 15, wherein receiving an indication of where messages are to be sent comprises receiving an address or telephone number to which electronic messages are to be directed.

19. The non-transitory computer readable medium of claim 18, wherein when conducting a step calls for an electronic message to be sent to the user, conducting the step comprises causing an electronic message to be sent to the received address or telephone number.

20. The non-transitory computer readable medium of claim 19, wherein when conducting a step calls for an electronic message to be sent to the user, causing the result of the step to be reported or presented to the tester comprises causing an indication of what electronic message was sent to be reported or displayed to the tester.

21. The non-transitory computer readable medium of claim 19, wherein when conducting a step calls for an electronic message to either be sent or not be sent to the user, depending on whether a condition is satisfied, conducting the step comprises:

determining whether the condition is satisfied; and sending or not sending the electronic message depending on the result of the determining step.

22. The non-transitory computer readable medium of claim 21, wherein when conducting a step calls for an electronic message to either be sent or not be sent to the user, depending on whether a condition is satisfied, causing a result of the step to be reported or presented to the tester comprises causing an indication of whether the condition was satisfied and whether the electronic message was sent to be reported or presented to the tester.

23. The non-transitory computer readable medium of claim 15, wherein when the way in which a step is conducted depends on whether the user takes or does not take an action, the method performed by the one or more processors further comprises:

causing action selections to be presented to the tester, the action selections comprising ways in which the user could take or not take the action; and receiving an indication of which of the action selections the tester has chosen, wherein conducting the step comprises conducting the step based on the received indication of which of the action selections the tester chose.

24. The non-transitory computer readable medium of claim 23, wherein when the way in which a step is conducted depends on whether the user takes or does not take an action, causing a result of the step to be reported or presented to the tester comprises causing an indication of which of the action selections the tester chose to be reported or presented to the tester.

25. The non-transitory computer readable medium of claim 15, wherein when the way in which a step is conducted depends on whether the user belongs to a predefined segment of users, conducting the step comprises using previously recorded data to determine whether the user belongs to the predefined segment of users.

26. The non-transitory computer readable medium of claim 25, wherein when the way in which a step is conducted depends on whether the user belongs to a predefined segment of users, causing a result of the step to be reported or presented to the tester comprises causing an indication of whether the user belongs to the predefined segment of users to be reported or presented to the tester.

27. The non-transitory computer readable medium of claim 15, wherein when the way in which a step is conducted calls for a selection to be made between two or more options, conducting the step comprises:

causing option selections to be presented to the tester, the option selections indicating the available options that determine how the step could be conducted; and receiving an indication of which of the option selections the tester has chosen, wherein conducting the step comprises conducting the step based on the received indication of which of the option selections the tester chose.

28. The non-transitory computer readable medium of claim 27, wherein when the way in which a step is conducted calls for a selection to be made between two or more options, causing a result of the step to be reported or presented to the tester comprises causing an indication of which of the option selections the tester chose to be reported or presented to the tester.

* * * * *